US012591270B2

(12) United States Patent
Datta et al.

(10) Patent No.: US 12,591,270 B2
(45) Date of Patent: Mar. 31, 2026

(54) COMPUTING DEVICE CASE

(71) Applicant: Apple Inc., Cupertino, CA (US)

(72) Inventors: Supratik Datta, Saratoga, CA (US);
Karan S. Jain, San Jose, CA (US);
Ehsan Khajeh, Los Gatos, CA (US);
Arash Akhavan Fomani, Saratoga, CA
(US); Daniel P Kumar, Fremont, CA
(US); Eng Eow Goh, Fremont, CA
(US); Meng Chi Lee, Los Altos, CA
(US); Gang Ning, San Jose, CA (US);
Andrew W. Joyce, San Jose, CA (US);
Chengrui Zhang, San Jose, CA (US);
Stephen T. Schooley, Menlo Park, CA
(US); Timothy C. Wulff, Boulder, CO
(US); Ross D. Arriens, San Jose, CA
(US); Hao Dong, Sunnyvale, CA (US);
Michael Sipper, Sandy Spring, MD
(US); Jenna Dancy, Longmont, CO
(US); Deepak Sharma, Santa Clara,
CA (US); Parin Patel, Monte Sereno,
CA (US)

(73) Assignee: APPLE INC., Cupertino, CA (US)

( * ) Notice: Subject to any disclaimer, the term of this
patent is extended or adjusted under 35
U.S.C. 154(b) by 60 days.

(21) Appl. No.: 18/660,118

(22) Filed: May 9, 2024

(65) Prior Publication Data

US 2025/0348112 A1 Nov. 13, 2025

(51) Int. Cl.
*G06F 1/16* (2006.01)
*G06F 3/02* (2006.01)
(Continued)

(52) U.S. Cl.
CPC .......... *G06F 1/1628* (2013.01); *G06F 3/0202*
(2013.01); *G06F 3/038* (2013.01); *G06F*
*3/039* (2013.01)

(58) Field of Classification Search
CPC ........ G06F 1/1628; G06F 1/1656; G06F 1/02;
G06F 1/0202; G06F 1/0227; G06F 1/038
See application file for complete search history.

(56) References Cited

U.S. PATENT DOCUMENTS 5,334,141 A 8/1994 Carr et al.
6,617,643 B1 9/2003 Goodwin-Johansson
(Continued)

FOREIGN PATENT DOCUMENTS

AU 2012348385 A1 4/2014
CA 2763106 A1 6/2013
(Continued)

OTHER PUBLICATIONS

CNC buttons single sets. Phone Rebel via Archive.org. (Apr. 2,
2023). https://web.archive.org/web/20230402001726/https://phonerebel.
com/products/buttons?variant=40095110529123.
(Continued)

*Primary Examiner* — Patrick F Marinelli
(74) *Attorney, Agent, or Firm* — Dorsey & Whitney LLP

(57) ABSTRACT

A case for an electronic device can include a case body
including an exterior surface and an interior surface, the
interior surface being positioned opposite the exterior sur-
face. The case can additionally include a button body
positioned at least partially within the case body between the
exterior surface and the interior surface, the button body
being movable inward and outward relative to the case body
along an axis of button travel. The case can further include
a biasing structure having a contact surface configured to
contact the button body, the biasing structure configured to
bias the button body toward the interior surface along the
axis of button travel.

20 Claims, 17 Drawing Sheets

(51) Int. Cl.
    *G06F 3/038*          (2013.01)
    *G06F 3/039*          (2013.01)

(56)            References Cited

U.S. PATENT DOCUMENTS

| | | | |
|---|---|---|---|
| 7,612,997 B1 | 11/2009 | Diebel et al. | |
| 8,390,255 B1 | 3/2013 | Fathollahi | |
| 8,902,154 B1 * | 12/2014 | Kahn | G06F 1/1694 |
| | | | 345/169 |
| 9,317,156 B2 * | 4/2016 | Sharma | G06F 3/0488 |
| D924,863 S | 7/2021 | Wright et al. | |
| 11,115,075 B2 | 9/2021 | Fong et al. | |
| 12,117,408 B1 | 10/2024 | Newman et al. | |
| 12,287,680 B1 * | 4/2025 | Datta | G06F 3/044 |
| 12,366,893 B2 * | 7/2025 | Myers | G06F 1/1658 |
| 2007/0280053 A1 | 12/2007 | Polany et al. | |
| 2008/0296650 A1 | 12/2008 | Ahn et al. | |
| 2011/0090626 A1 | 4/2011 | Hoellwarth et al. | |
| 2013/0082963 A1 | 4/2013 | Chu | |
| 2013/0314030 A1 | 11/2013 | Fathollahi | |
| 2014/0001022 A1 | 1/2014 | Weber et al. | |
| 2014/0020947 A1 | 1/2014 | Richardson et al. | |
| 2015/0270734 A1 | 9/2015 | Davison et al. | |
| 2016/0286920 A1 | 10/2016 | Lean et al. | |
| 2016/0357324 A1 | 12/2016 | Smith et al. | |
| 2017/0028494 A1 | 2/2017 | Usenbenz et al. | |
| 2017/0249028 A1 | 8/2017 | Marshall et al. | |
| 2021/0043749 A1 | 2/2021 | Lee et al. | |
| 2021/0328394 A1 | 10/2021 | Carnevali et al. | |
| 2022/0075464 A1 * | 3/2022 | Lee | H05K 5/0217 |
| 2022/0262801 A1 | 8/2022 | Teo | |
| 2024/0162172 A1 | 5/2024 | Liao | |
| 2024/0288949 A1 * | 8/2024 | Hoover | G06F 1/1628 |
| 2024/0336846 A1 | 10/2024 | Kim | |
| 2024/0385661 A1 * | 11/2024 | Balaji | G06F 1/1698 |
| 2024/0393830 A1 | 11/2024 | Barnett et al. | |
| 2025/0023971 A1 * | 1/2025 | Deng | H04M 1/0279 |
| 2025/0226162 A1 | 7/2025 | Otsuki et al. | |
| 2025/0245784 A1 | 7/2025 | Ouchi | |
| 2025/0348110 A1 | 11/2025 | Datta et al. | |
| 2025/0348111 A1 | 11/2025 | Datta et al. | |
| 2025/0348113 A1 | 11/2025 | Datta et al. | |
| 2025/0348114 A1 | 11/2025 | Datta et al. | |
| 2025/0349477 A1 | 11/2025 | Datta et al. | |

FOREIGN PATENT DOCUMENTS

| | | |
|---|---|---|
| CN | 102687103 A | 9/2012 |
| CN | 209627440 U | 11/2019 |
| CN | 110933202 A | 3/2020 |
| EP | 2762985 A1 | 8/2014 |
| KR | 19990014476 U | 5/1999 |
| WO | 2015105894 A1 | 7/2015 |
| WO | 2022042239 A1 | 3/2022 |
| WO | 2023074187 A1 | 5/2023 |

OTHER PUBLICATIONS

International Search Report and Written Opinion for International Application No. PCT/US2025/022459 dated Aug. 14, 2025.
Invitation to Pay Additional Fees and Partial Search Report for International Application No. PCT/US2025/022459 dated Jun. 24, 2025.
Invitation to Pay Additional Fees and Partial Search Report for International Application No. PCT/US2025/022541 dated Jul. 1, 2025.
Invitation to Pay Additional Fees and Partial Search Report for International Application No. PCT/US2025/022591 dated Jun. 30, 2025.
Invitation to Pay Additional Fees and Partial Search Report for International Application No. PCT/US2025/022607 dated Jul. 9, 2025.
Invitation to Pay Additional Fees and Partial Search Report for International Application No. PCT/US2025/022618 dated Jul. 1, 2025.
International Search Report and Written Opinion for International Application No. PCT/US2025/022541 dated Aug. 22, 2025.
International Search Report and Written Opinion for International Application No. PCT/US2025/022591 dated Aug. 21, 2025.
International Search Report and Written Opinion for International Application No. PCT/US2025/022618 dated 22 August.

* cited by examiner

INWARD ⟷ OUTWARD

COMPUTING DEVICE CASE

FIELD

The described embodiments relate generally to accessories and covers for computing devices. More particularly, the present embodiments relate to a case that includes a button compatible with capacitive and force sensing at the computing device.

BACKGROUND

Portable computing devices have grown in popularity and ubiquity worldwide in recent years. The convenience and adaptability of portable computing devices such as tablet computers and smart phones have therefore helped serve the needs of users for many purposes. When using a portable computing device such as a tablet or smartphone, it is common to use a computing device case or cover to protect the device from damage and provide additional functionality. Although convenient for protecting portable computing devices and increased productivity, traditional portable computing device covers and cases often limit input functionality. Typical cases include a button portion that is subtraction-formed from the case body to allow user depression of the button portion that, in turn, causes depression of a device button on the computing device aligned within or below the case button portion. These simple buttons of traditional cases are limited to providing an affirmative click (or push) depression that causes a corresponding click depression of the device button. Accordingly, there is a constant need for improvements to the cases for computing devices, particularly case buttons and associated input functionality.

SUMMARY

An aspect of the present disclosure relates to a case for an electronic device. The case can include a case body including an exterior surface and an interior surface, the interior surface being positioned opposite the exterior surface. The case can additionally include a button body positioned at least partially within the case body between the exterior surface and the interior surface, the button body being movable inward and outward relative to the case body along an axis of button travel. The case can further include a biasing structure having a contact surface configured to contact the button body, the biasing structure configured to bias the button body toward the interior surface along the axis of button travel.

In some examples, the biasing structure seats the button body along at least two perpendicular axes at a predetermined position and orientation within the case body. In one example, the biasing structure includes at least one of a magnet or a ferromagnetic insert. In particular examples, the biasing structure includes an elastically compliant seal. In some examples, the elastically compliant seal includes a first end cantilevered from the case body, a second end curved into the button body, and a middle portion extending laterally inward from the first end toward the second end. In particular implementations, the biasing structure is configured to apply a preload force on the button body relative to the case body, the preload force having a magnitude within a range of about 8 grams-force to about 30 grams-force.

Another aspect of the present disclosure relates to a cover for an electronic device. The cover can include a cover body defining an opening; a button disposed within the opening, the button including an abutment surface; a first seal positioned to protrude from the cover body and having an innermost surface parallel to the abutment surface; and a second seal attached to the cover body and the button.

In some examples, the button and the first seal are both lozenge-shaped. In at least one example the first seal surrounds a perimeter of the opening. In certain implementations, the second seal includes a flexible fluid-tight material. In particular examples, the button includes: a button body; and button trim attached to the button body and to the second seal. In one or more examples, the button includes: a button body; and a cap attached to the button body, the cap having a dielectric constant greater than 10. In some examples, the button includes an ink material positioned between the button body and the cap. In a particular example, the second seal is configured to apply a force to the button, wherein the second seal biases the button inward through the opening and past the first seal.

Yet another aspect of the present disclosure relates to a system that includes an electronic device and a device interface configured to engage the device housing. The electronic device can include a device housing and a device button disposed within the device housing. The device interface can include: a frame, a button disposed within the frame; and a seal. The seal can be positioned on the frame and surround a perimeter of the button, the seal being configured to contact the device housing when the electronic device is engaged with the frame, wherein the seal is configured to inhibit contaminant ingress between the device housing and the frame.

In some examples, the seal is compressible to a position that enables the button and the device button to remain in continuous contact at a contact interface. In particular examples, the electronic device is configured to capacitively sense a user input at the button through the contact interface and the device button. In one or more examples, the seal is a first seal, and the case further includes a second seal configured to bias the button toward the device button. In some examples, a compressibility of the first seal allows the button to apply a preload force from the second seal to the device button, the preload force being within a target range of force values. In at least one example, the frame of the device interface includes a back wall and a set of side walls extending away from the back wall; and the button is disposed within a side wall of the set of side walls.

One aspect of the present disclosure relates to a case for an electronic device. The case can include a case body comprising an exterior surface and an interior surface, the interior surface being positioned opposite the exterior surface. The case can additionally include a ceramic case button positioned at least partially within the case body between the exterior surface and the interior surface, the ceramic button being movable inward and outward relative to the case body along an axis of button travel.

In some examples, the ceramic case button is configured to abut a device button on an electronic device when the electronic device is disposed within the case body. In certain examples, the ceramic case button is configured to charge couple a user finger and the device button. In particular examples, the case body comprises a dielectric constant lower than 8. In one or more examples, the ceramic case button comprises a dielectric constant ranging between 1000 and 3000. In certain implementations, the ceramic case button is comprised entirely of ceramic.

Another aspect of the present disclosure relates to a system that includes an electronic device and a device interface. The electronic device can include a touch sensor and an electric ground positioned adjacent to the touch sensor. The device interface can include a frame and a button disposed within the frame. The button can include a non-metallic button insert having a dielectric constant greater than 20, the non-metallic button insert configured to be positioned over the touch sensor and spaced laterally inward to define a gap between the non-metallic button insert and the electric ground.

In some examples, the frame comprises a dielectric constant between 1 and 4. In certain examples, the touch sensor comprises a plurality of sensor pixels. In particular examples, the touch sensor is configured to positionally identify a user input at the non-metallic button insert relative to one or more sensor pixels of the plurality of sensor pixels. In one or more examples, the non-metallic button insert overlaps each sensor pixel of the plurality of sensor pixels. In particular implementations, the gap is larger along a width of the non-metallic button insert than a length of the non-metallic button insert. In at least one implementation, the width of the non-metallic button insert is between 50% and 80% of a width of the button. In some examples, the length of the non-metallic button insert is between 70% and 95% of a length of the button. In certain examples, the non-metallic button insert comprises a signal attenuation factor greater than 0.6.

Yet another aspect of the present disclosure relates to a case for an electronic device. The case can include a frame that includes: a back wall; and a set of side walls extending away from the back wall. The case can additionally include a button disposed within a side wall of the set of side walls, the button comprising a material with a dielectric constant ranging between 20 and 200.

In some examples, the material is a composite material formed in a matrix configuration defining a plurality of pockets. In certain examples, the button comprises a plurality of ceramic inserts disposed within the plurality of pockets. In particular examples, the material comprises a doped material to increase a permittivity of the button. In one or more examples, the button is substantially charge-insulated from the frame.

An aspect of the present disclosure can include a case for an electronic device. The case can include a case body comprising an exterior surface and an interior surface, the interior surface being positioned opposite the exterior surface. The case can additionally include a case button positioned at least partially within the case body between the exterior surface and the interior surface, the case button being movable inward and outward relative to the case body along an axis of button travel. The case button can include: a first set of regions disposed on a first surface; and a second set of regions disposed on a second surface opposite the first surface, wherein the second set of regions is respectively charge coupled to the first set of regions such that a transfer of electrical charge is configured to independently occur between a particular region of the first set of regions and a particular region of the second set of regions.

In some examples, the first set of regions comprises a first set of conductive pads; and the second set of regions comprises a second set of conductive pads. In particular examples, the case further includes: conductors connecting the first set of conductive pads and the second set of conductive pads; and a substrate insulating the conductors. In certain examples, the case further includes a set of electrical connectors disposed between the first surface and the second surface, the set of electrical connectors having end portions that define the first set of regions and the second set of regions. In one or more examples, each region of the first set of regions is spaced apart by a first gap; and each region of the second set of regions is spaced apart by a second gap. In at least one example, the first gap is aligned with the second gap. In one or more examples, the case further includes a sapphire cap positioned over the first set of regions. In certain implementations, the case further includes a first solder mask positioned over the first set of regions and a second solder mask positioned over the second set of regions, wherein the first solder mask and the second solder mask comprise a thickness of less than 10 micrometers.

Another aspect of the present disclosure relates to a system that includes an electronic device comprising a touch sensor that includes sensor pixels. The system can additionally include a device interface that includes: a button body; a first set of pads on a first surface of the button body; a second set of pads on a second surface of the button body opposite the first surface; and conductors extending through the button body, the conductors electrically coupling the first set of pads and the second set of pads, wherein the second set of pads are aligned with the sensor pixels when the electronic device is engaged with the device interface.

In some examples, the touch sensor is configured to positionally identify a user input at the button body relative to at least one of the sensor pixels. In particular examples, an electric field emitted by the touch sensor is configured to be transmitted through the sensor pixels, the second set of pads, the conductors, and the first set of pads. In certain examples, at least one pad of the first set of pads is larger than the second set of pads. In one or more examples, the first set of pads is aligned relative to the second set of pads. In at least one example, the first set of pads, the second set of pads, and the conductors comprise a copper material. In some examples, the system can further include: a first cosmetic layer concealing the first set of pads; and a second cosmetic layer concealing the second set of pads.

Yet another aspect of the present disclosure relates to a case for an electronic device. The case can include a frame that includes a back wall and a set of side walls extending away from the back wall. The case can additionally include a button disposed within a side wall of the set of side walls, the button comprising: a core portion; opposing surfaces defined by the core portion; and a plurality of electrical connectors extending through the core portion between the opposing surfaces.

In some examples, the plurality of electrical connectors are concealed on at least one surface of the opposing surfaces by a material having a dielectric constant greater than 10. In particular examples, the plurality of electrical connectors comprises conductive pillars having an aluminum material or a stainless steel material. In certain examples, the plurality of electrical connectors comprises: end portions co-planar with the opposing surfaces; and intermediate portions disposed between the end portions, the intermediate portions being encapsulated by the core portion. In one or more examples, the end portions are arranged in a row configuration.

One aspect of the present disclosure relates to a case for an electronic device. The case can include a case body and a case button. The case button can be positioned at least partially within the case body, the case button being movable inward and outward relative to the case body along an axis of button travel, and the case button comprising: input regions disposed on a first surface, the input regions configured to receive a user input adjacent to a first input region of the input regions; and receptor regions disposed on a second surface opposite the first surface, wherein the receptor regions are respectively charge coupled to the input regions such that, in response to the user input, a transfer of electrical charge is configured to occur substantially between the first input region and a first receptor region of the receptor regions.

In some examples, in response to the user input including a swipe or a scroll from adjacent the first input region to adjacent a second input region of the input regions, an additional transfer of electric charge occurs between the second input region and a second receptor region of the receptor regions. In particular examples, in response to the user input, a portion of an electric field in the case button between the first input region and the first receptor region changes from a first orientation relative to the input regions to a second orientation relative to the input regions. In certain examples, in response to the user input moving to a different input region, the portion of the electric field in the case button between the first input region and the first receptor region changes from the second orientation to a third orientation relative to the input regions, the third orientation being different from at least the second orientation. In one or more examples, the case can include conductors extending through the case button and connecting the input regions and the receptor regions, wherein in response to the user input, the transfer of electric charge occurs through at least one of the conductors.

Another aspect of the present disclosure relates to a system that includes an electronic device. The electronic device can include a device button and sensors coupled to the device button, the sensors configured to identify a first input type using a first sensor, a second input type using a second sensor, and a third input type using a third sensor. In some examples, the system can additionally include a device interface comprising a button body configured to cover the device button, the button body permitting user inputs of the first input type, the second input type, and the third input type to be transferred to the device button through the button body.

In some examples, the first sensor is a collapsible switch configured to identify the first input type, the first input type comprising a press input correlating to depression of the button body relative to the device interface that causes the collapsible switch to collapse. In particular examples, the second sensor is a force sensor configured to identify the second input type, the second input type comprising a partial press input correlating to an applied force that partially depresses the button body relative to the device interface that activates the force sensor, the applied force having a magnitude insufficient to actuate the first sensor. In certain examples, the electronic device comprises a camera device. In these or other examples, the second input type can be configured to cause the camera device to focus; and the first input type is configured to cause the camera device to capture image content.

In some examples, the third sensor is a capacitance sensor configured to identify the third input type, the third input type comprising a touch input of at least one of a scroll, a swipe, a tap, or a finger rest. In particular examples, the third input type is configured to navigate a graphical user interface on a display of the electronic device; and the first input type is configured to interact with a user interface element of the graphical user interface. In certain examples, the third sensor is a capacitance sensor configured to identify a fourth input type, the fourth input type comprising a hover input correlating to a user finger positioned within a threshold proximity away from the button body. In one or more examples, the electronic device is configured to alter a user interface for display in anticipation of an additional user input subsequent to the hover input.

Yet another aspect of the present disclosure relates to a system that includes an electronic device and a case. The electronic device can include a device button coupled to a collapsible switch, a force sensor, and a capacitance sensor. The case can include a frame and a button disposed within the frame, the button being operable to transfer a force to actuate the collapsible switch, transfer the force to generate a force signal via the force sensor, and to transfer electric charge to generate a capacitance signal via the capacitance sensor.

In some examples, the capacitance sensor is enabled to detect a position of a touch input applied to the button relative to an outer surface of the button. In particular examples, the capacitance sensor is configured detect changes in an electrical field permitted to pass through the button, the changes in the electrical field correlating with dynamic motion of a user finger along an outer surface of the button. In certain examples, the force comprises a force magnitude detectable at the force sensor, the force magnitude being less than an actuation force to actuate the collapsible switch. In one or more examples, the electronic device can further include: a display; a processor; and a memory device storing instructions that, when executed by the processor, cause the processor to: identify a first user input based on the force signal, the capacitance signal, or an actuation signal from the collapsible switch; and generate, based on the first user input, a first display signal causing the display to generate a first graphical user interface.

In some examples, the memory device comprises instructions that, when executed by the processor, cause the processor to: identify a second user input based on another one of the force signal, the capacitance signal, or the actuation signal; and generate, based on the second user input, a second display signal causing the display to generate a second graphical user interface at least partially different from the first graphical user interface. In particular examples, the electronic device includes a processor and a memory device storing a software application and instructions that, when executed by the processor, cause the processor to: identify a user input based on the force signal, the capacitance signal, or an actuation signal from the collapsible switch; and generate, based on the user input, a signal causing the memory device to run the software application.

One aspect of the present disclosure relates to a system that includes an electronic device. The electronic device can include a device button and a capacitance sensor coupled to the device button, the capacitance sensor configured to measure changes in capacitance up to a first distance away from the capacitance sensor and through the device button. The system can additionally include a case. The case can include a case button that, when disposed against the device button, enables the capacitance sensor to measure changes in capacitance up to a second distance away from the capacitance sensor and through both of the device button and the case button, the second distance being greater than the first distance.

In some examples, the case button comprises a button thickness; and the second distance is greater than the button thickness. In particular examples, the second distance is between 1 millimeter and 2 millimeters greater than the first distance. In certain examples, the second distance correlates with an outer surface of the case button; and the case button comprises a non-metallic insert having a dielectric constant greater than 20 to enable the capacitance sensor to perform capacitive touch sensing at the outer surface of the case button. In one or more examples, the second distance correlates with an outer surface of the case button; and the case button comprises: a first set of conductive pads disposed adjacent to the outer surface; a second set of conductive pads disposed adjacent to an inner surface opposite the outer surface, the inner surface configured to contact the device button; and conductors extending through the case button and connecting the first set of conductive pads and the second set of conductive pads, wherein the capacitance sensor is configured to sense a change in capacitance caused by a user touch at the outer surface of the case button via one or more of the first set of conductive pads, the conductors, and the second set of conductive pads.

In some examples, the electronic device can include: a processor; and a memory device storing instructions that, when executed by the processor, cause the processor to: identify a first capacitance signal from the capacitance sensor, the first capacitance signal having a first signal property for a first time period; identify a second capacitance signal from the capacitance sensor, the second capacitance signal having a second signal property for a second time period; and transmit a signal to one or more components of the electronic device based on a change from the first signal property to the second signal property lasting at least the second time period. In certain examples, the electronic device comprises a force sensor at the device button; and the electronic device is configured to calibrate the force sensor when the case is disposed around the electronic device.

Another aspect of the present disclosure relates to a system that includes a touch input interface and a computing device. The touch input interface can include a button body. The computing device can be positionable against the touch input interface, the computing device comprising: a device button configured to be covered by the button body; a capacitance sensor coupled to the device button; a processor; and a memory device storing instructions. The instructions can, when executed by the processor, cause the processor to: identify a first capacitance signal from the capacitance sensor, the first capacitance signal having a first signal property for a first time period; identify a second capacitance signal from the capacitance sensor, the second capacitance signal having a second signal property for a second time period; and transmit a signal to one or more components of the computing device based on a change from the first signal property to the second signal property lasting at least the second time period.

In some examples, the change from the first signal property to the second signal property indicates a magnitude of signal attenuation due to at least one of a particle contaminant disposed between the button body and the device button or misalignment between the device button and the button body. In particular examples, the computing device comprises a display; and the processor is configured to transmit the signal to the display to cause the display to generate a user interface prompt requesting a user to remove the particle contaminant or adjust the touch input interface relative to the computing device. In certain examples, the change from the first signal property to the second signal property indicates a magnitude of signal attenuation due to normal operation of the button body being positioned over the device button.

In some examples, the computing device comprises a display; and the processor is configured to transmit the signal to the display to cause the display to generate a user interface prompt confirming that the touch input interface is connected to the computing device. In particular examples, the processor is configured to transmit the signal to the capacitance sensor to change one or more sensing parameters. In certain examples, the computing device comprises a force sensor coupled to the device button; and the processor is configured to transmit the signal to the force sensor to cause the force sensor to calibrate for a resting force applied by the button body to the device button.

In some examples, the memory device can include instructions that, when executed by the processor, cause the processor to: identify the first capacitance signal from the capacitance sensor, the first capacitance signal having the first signal property for a third time period following the second time period; and transmit an additional signal to the one or more components of the computing device based on a return from the second signal property to the first signal property lasting at least the third time period. In particular examples, the computing device comprises a display; and the processor is configured to transmit the additional signal to the display to cause the display to generate a user interface prompt confirming that the touch input interface is disconnected from the computing device. In certain examples, the second time period ranges between 2 seconds and 10 seconds.

Yet another aspect of the present disclosure relates to a system that includes an electronic device and a case. The electronic device can include a device button; a force sensor configured to measure an input force applied to the device button; a processor; and a memory device. The case can include a case button that, when disposed around the device button, applies a resting force against the device button. In some examples, the memory device can store instructions that, when executed by the processor, cause the processor to transmit a signal to one or more components of the electronic device when the force sensor detects the resting force for a time period. In particular examples, the processor is configured to transmit the signal to the force sensor to cause the force sensor to calibrate for the resting force. In certain examples, the resting force comprises a magnitude ranging between 8 grams-force and 30 grams-force.

BRIEF DESCRIPTION OF THE DRAWINGS

The disclosure will be readily understood by the following detailed description in conjunction with the accompanying drawings, wherein like reference numerals designate like structural elements, and in which:

FIG. 3F (top) illustrates a profile view of an outer side or input side of a button, and FIG. 3F (bottom) illustrates a profile view of an inner side or receptor side of the button. FIG. 3G illustrates a perspective, exploded view of the button in FIG. 3F.

FIG. 3H (top) illustrates a profile view of an outer side or input side of a button, and FIG. 3H (bottom) illustrates a profile view of an inner side or receptor side of the button. FIG. 3I illustrates a perspective, exploded view of the button in FIG. 3H.

FIG. 11A shows an outer side or input side perspective view, and FIG. 11B shows an inner side or receptor side perspective view, of the case button.

FIGS. 12A-12C illustrate example electric field orientations corresponding to a set of user input conditions at a button in accordance with one or more examples of the present disclosure.

DETAILED DESCRIPTION

Figure 1A:
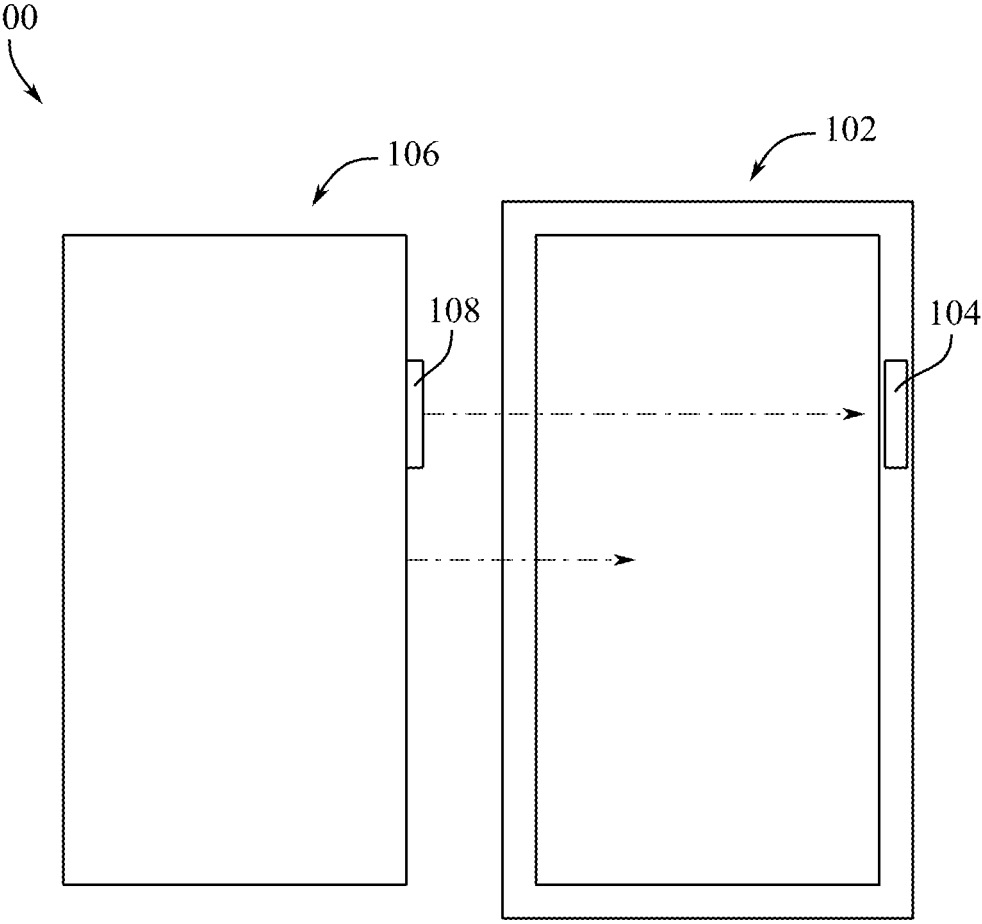
FIG. 1A illustrates a schematic view of a system that includes an example electronic device and an example case in accordance with one or more examples of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a case (or cover) for electronic devices. The case can implement a case button that enables an electronic device disposed within the case to extend a capacitive sensing capability beyond the case, particularly through the case button. To do so, the case can include a variety of structures that allow electric fields or flux to proceed between the outer surface of the case button and the electronic device (e.g., through a device button and through a case button aligned with the device button). In so doing, these structures can also enable a wider variety of user inputs at or near the case button (e.g., taps, swipes, scrolls, pinches, partial presses, finger hover above the case button, finger rest on the case button, etc.).

In some examples, the case can include one or more biasing structures that position and orient the case button in direct, abutting, face-to-face/surface-to-surface, intimate contact with the device button (e.g., via a predetermined, tuned preload force applied by the one or more biasing structures for the case button). The case can also implement one or more seals, such as a stand-off seal that can position the case body relative to the device housing. The stand-off seal (and other seals) disclosed herein can also inhibit contaminant ingress in and around the button area to help maintain a clean contact interface between the device button and the case button. A clean contact interface can help maintain sensor detectability of different user input types and locations relative to the case button.

A case button can also include a variety of materials and/or structures within the button body that allow detection of a wide array of user inputs (including capacitive touch inputs) to be applied and detected through the case button. In some examples, the case button can include conductive pads and conductors connecting the conductive pads positioned on opposing sides of the case button (thereby allowing transfer of electric charge through the case button). In other examples, the case button can omit one or more sets of pads in lieu of conductive pillars extending through the button body. Still, in other examples, the case button can include a high dielectric body or insert (e.g., a ceramic insert, a doped material insert, or a multi-insert matrix) that can also allow the transfer of electric charge through the case button.

These and other embodiments are discussed below with reference to FIGS. 1A-14B. However, those skilled in the art will readily appreciate that the detailed description given herein with respect to these figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A illustrates a system 100 that can include a case 102 and a computing device 106. The terms "case," "device interface," or "touch input interface" can be referred to as a removable cover, housing, panel, skin, protector, protective shell, enclosure, or combinations thereof that is sized and shaped to receive or attach to the outer body or housing of the computing device 106. The case 102 can engage (e.g., contact, hold, support, mate with, attach to, etc.) the computing device 106. The case 102 can therefore act as a barrier preventing other objects from contacting and potentially damaging at least the rear surface of the computing device 106. The case 102 may be removable and reattachable to the computing device 106 without damage to the case 102 or computing device 106, and the computing device 106 may be operated normally without the case 102 being attached to it.

In one or more examples, the case 102 can include a button 104 (also referred to herein as a case button). The particular structure of the button 104 in relation to the case 102 is described below in relation to FIGS. 1B-4. In general, however, the button 104 can include structural elements for transferring a force applied by a user depression on the outside of the button 104 to a device button 108. For example, the button 104 can transfer a push, click, or other force input applied to the outside of the button 104 to the device button 108.

In addition, the button 104 can transfer other types of user inputs to the device button 108. That is, the computing device 106 can sense user inputs at the computing device 106 through the button 104 that are not limited to force inputs. For example, the computing device 106 can sense touch inputs that are more nuanced or user-subjective compared to typical force inputs or a conventional button press. To illustrate, the computing device 106 can be configured to sense taps, swipes, scrolls, pinches, swirls, rolls, partial presses, etc. at the device button 108. In certain implementations, the computing device 106 can sense through case button 104, the presence of a user's finger resting on the button 104 via at least one sensor at device button 108. In at least one example, a sensor of the computing device 106 can detect the presence of a user's finger in close proximity to the case button 104 (e.g., within about 2 inches, about 1 inch, about 0.5 inches, about 0.25 inches, or about 0.125 inches), even if the finger is not in contact with the button 104. In these or other examples, the button 104 can be capacitively coupled to the device button 108 such that the button 104 can sense one or more of the foregoing user inputs at the button 104 (e.g., capacitively sense user inputs through the button 104, through an interface between the button 104 and the device button 108, and through the device button 108).

It will be appreciated that the button 104 can be positioned at a variety of different locations of the case 102, depending on the location of the device button 108 on the computing device 106. In some examples, the button 104 is disposed within a sidewall of the case 102 (e.g., a wall covering a lateral side of the computing device 106. Additionally or alternatively, the button 104 can be disposed within a rear wall (e.g., a back wall) or front wall of the case 102.

The button 104 can also include a variety of one or more materials. As will be discussed in detail in relation to subsequent figures, the button 104 can include ceramic materials, insulative materials paired with conductors, doped material, similar materials, and combinations thereof. These and/or other materials can facilitate the transfer of electric charge through the button 104.

As shown, the system 100 can include the computing device 106. In particular implementations, the computing device 106 includes a tablet computing device. However, the computing device 106 can include one or more of a variety of different types of computing devices (or electronic devices), such as notebook computers, desktop computers, smart phones, wearables, watches, head-mountable devices (e.g., smart glasses, augmented reality and/or mixed reality headsets), audio devices (e.g., ear buds, headphones, ear muffs), servers, similar devices, and combinations thereof. Indeed, the computing device 106 is shown merely as an example device with which aspects of the present disclosure are illustrated for convenience in providing an explanation and should not be viewed as limited to a tablet computing device or smart phone.

Similarly, the device button 108 can include various types of buttons. A button can include one or more regions of an electronic device that can receive user input. A button can physically actuate (e.g., move up and down or rotate) in some examples, albeit not required. Additionally or alternatively, a button on a computing device can electrically actuate (e.g., cause the transmission of electrical signals) in response to a detected user input. Thus, in some embodiments, the device button 108 can include switches, circuitry, sensors, etc. to enable various device functionality and/or compatibility with the button 104 when the computing device 106 is disposed within the case 102.

Figure 1B:
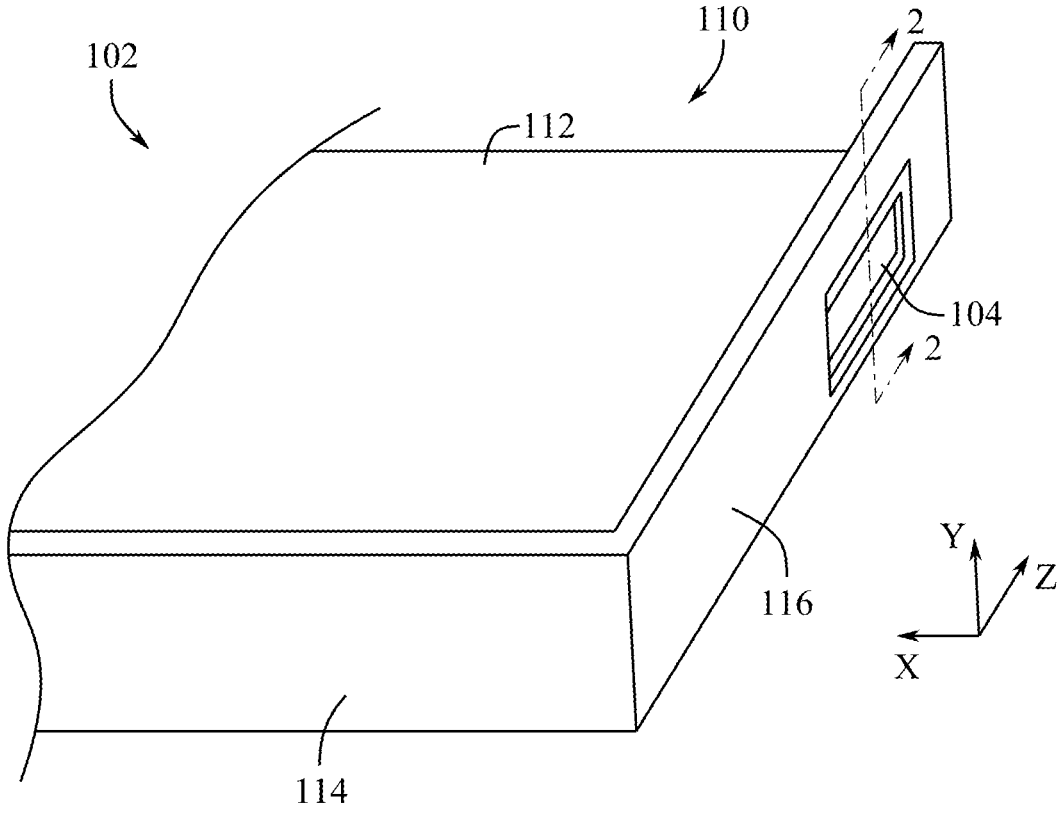
FIG. 1B illustrates a portion of an example case in accordance with one or more examples of the present disclosure.

FIG. 1B illustrates an example portion of the case 102 in accordance with one or more examples of the present disclosure. As shown, the case 102 includes a frame 110. The frame 110 can include a back wall 112 and side walls 114, 116 extending away from the back wall 112 (e.g., approximately perpendicular relative to the back wall 112). Not all side walls of the case 102 are shown in FIG. 1B, such as a side wall positioned on the opposite side of back wall 112 relative to sidewall 114 and extending from back wall 112 in the positive Y-direction.

A sidewall in connection to the case 102 (or the case 102 discussed above) refers to a member that is configured to at least partially cover or overlap with a lateral side of the computing device 106. A combination of sidewalls can be implemented (e.g., to at least partially wrap around each lateral side of the computing device 106). In some embodiments, the lateral sides are positioned surrounding a front face of the computing device 106 through which a display is viewed by the user and extend between the front face and the rear face positioned opposite the front face.

In addition, a back wall (or rear wall) in connection to the case 102 refers to a member that is configured to at least partially cover or overlap with a back side or bottom side of the computing device 106 that is opposite a display or other primary viewing or input surface of the computing device 106. In particular examples, the back wall 112 can cover all (or substantially all) of the rear surface of the computing device 106 (e.g., all of the rear surface of the computing device 106 except for a cutout for a camera or another rear-facing sensor).

Further shown, the button 104 can be disposed within the side wall 116. However, it will be appreciated that the button 104 can be positioned at a variety of different locations on the frame 110, depending on the location of the device button on the computing device to be inserted into the case 102. For instance, in some examples, the button 104 is disposed within the side wall 114. Additionally or alternatively, the button 104 can be disposed within the back wall 112 of the case 102. In particular examples, the button 104 is positioned at multiple locations (e.g., along multiple side walls and/or the back wall 112) and may correspond to different device functions, such as a power button, a volume button, a scroll button, a capture button, etc.

Any of the features, components, parts, including the arrangements and configurations thereof shown in FIGS. 1A-1B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 1A-1B.

Figure 2:
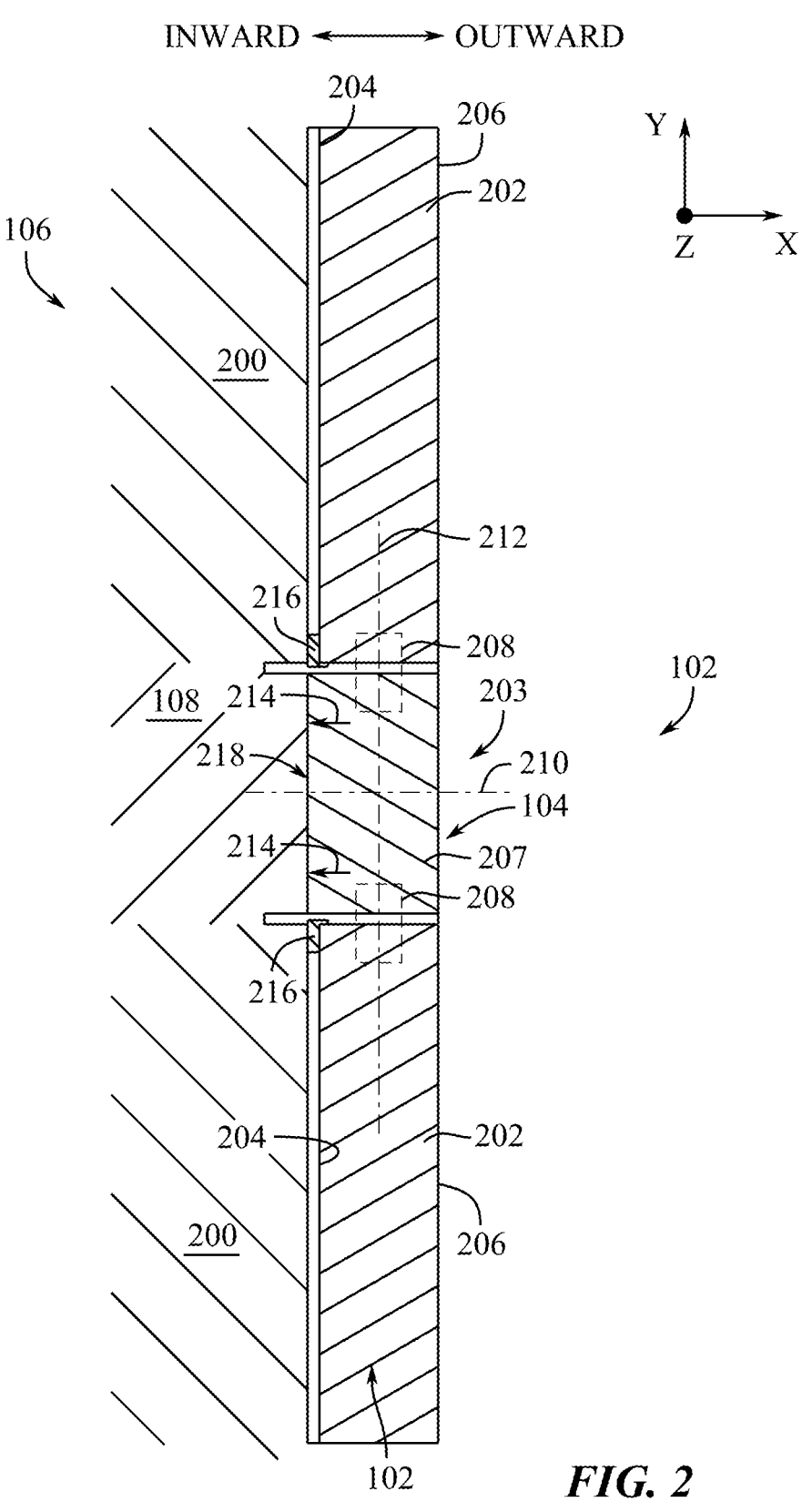
FIG. 2 illustrates a schematic cross-sectional view of an electronic device disposed within a case in accordance with one or more examples of the present disclosure.

FIG. 2 illustrates a schematic cross-sectional view of an example electronic device disposed within an example case in accordance with one or more examples of the present disclosure. As shown, the electronic device (e.g., the computing device 106) can include the device button 108 disposed on or within a device housing 200 (e.g., an enclosure, chassis, or frame of the computing device 106). The device button 108 can be aligned with the button 104 of the case 102 (e.g., along an axis of button travel 210) when the computing device 106 is positioned on or within the case 102.

Additionally shown, the case 102 can include a case body 202 (also referred to as a cover body or frame) that includes an interior surface 204 and an exterior surface 206 opposite the interior surface 204. The case body 202 can include a support, shell, framework, body member, etc. that forms at least one of the wall(s) or panel(s) (e.g., the back wall 112 and/or the side walls 114, 116 discussed above) for the case 102. In these or other examples, the case body 202 can define an opening 203.

The button 104 can include a button body 207 (e.g., a button module, core, central portion, hull) disposed in the opening 203 and positioned at least partially within the case body 202 between the interior surface 204 and the exterior surface 206. In some examples, the button body 207 can move inward and outward relative to the case body 202 along the axis of button travel 210. Additional detail of the button 104, particularly the button body 207, is provided below in relation to FIGS. 3A-3B and FIG. 4.

In one or more examples, the case 102 can include one or more biasing structures 208. A biasing structure can include any element that can bias an object (whether through physical contact or force fields (e.g., electromagnetic fields)) or otherwise hold an object at a predetermined position and orientation. A biasing structure can be movable relative to the case case body 202 and flexible (as opposed to immovable and rigid). A biasing structure, such as a spring, can store potential energy to bias an object. Other biasing structures can use pre-shaped or formed materials that, albeit elastic, can maintain a predetermined position (e.g., a rest position) to bias the button 104 to a certain position. In at least one example, and as will be discussed below, a biasing structure can include a seal (e.g., an elastically compliant seal). Still, in other examples, a biasing structure can include at least one of a magnet (e.g., a permanent magnet) or a ferromagnetic insert (e.g., a block, tab, or piece made of iron, steel, nickel, cobalt, etc.) that forms a magnetic attraction when placed within the magnetic field of a magnet.

The one or more biasing structures 208 can have a variety of structural and positional configurations discussed below in relation to subsequent figures. In at least some implementations, the one or more biasing structures 208 are disposed between the case body 202 and the button body 207 (e.g., to movably anchor certain portions of the case body 202 and the button body 207 together and/or provide contact therebetween). Accordingly, in some examples, the one or more biasing structures 208 can include a contact surface in contact with (or configured to contact) the button body 207. Via the contact surface, the one or more biasing structures 208 can bias the button body 207 inward (i.e., inside the interior surface 204 and toward the computing device 106, i.e., in the negative X-direction in FIG. 2) along the axis of button travel 210. For example, the one or more biasing structures 208 can apply a preload force 214 on the button body 207 relative to the case body 202 to cause the button body 207 to push inward through the opening 203 and contact the device button 108 at a contact interface 218 (e.g., a conductive contact interface between the device button 108 and the button 104, an abutment plane in contact with the device button 108 and the button 104, etc.).

In some examples, the preload force 214 and resultant contact between the button 104 and the device button 108 can enable the computing device 106 to perform capacitive sensing (e.g., detection of changes in capacitance or electric field properties using one or more capacitive sensors positioned adjacent to or within the device button 108). For instance, the computing device 106 can capacitively sense a user input at the button 104 through the contact interface 218 and the device button 108. In other words, the preload force 214 can capacitively couple the button 104 and the device button 108 by reducing (or entirely eliminating) an air gap between the button 104 and the device button 108 at the contact interface 218 to allow, direct, or concentrate charge flow or electric flux between the button 104 and the device button 108.

The preload force 214 can include a variety of force types-including a biasing force, a resting force, a constant applied force, a spring force, an elastic force, a tensile force, a compression force, similar forces, and combinations thereof. In these or other examples, the preload force 214 can have various magnitudes, including a target range of magnitudes (e.g., a range of force magnitudes that can allow certain case-device functionality and/or ergonomics). In particular examples, the preload force 214 can have a magnitude within a range of about 8 grams-force to about 30 grams-force. Within this example target range of force values for the preload force 214, the button 104 can maintain contact with the device button 108, thereby ensuring that capacitive sensing is consistent and maintained through the button 104 due to elimination of any gap between the button 104 and device button 108 irrespective of the orientation of the button 104 relative to gravity. Conversely, the example target range of the preload force 214 does not overload the device button 108 such that the preload force 214 detracts from or perceptibly lessens the user-expected feel (or haptic response) in providing a touch input at the button 104. Specifically, the preload force 214 does not, by itself, actuate a switch (e.g., a collapsible dome switch) of the device button 108, thereby maintaining the tactile feel of the device button 108 through the button 104.

In certain implementations, the preload force 214 can be used to situate the button body 207 at a particular position in three-dimensional space relative to the case body 202. For example, the one or more biasing structures 208 can seat the button body 207 along at least two perpendicular axes (e.g., the axis of button travel 210 perpendicular to the case body 202 and an axis 212 parallel to the case body 202) at a predetermined position and orientation within the case body 202. The preload force 214 can specifically constrain the button body 207 along the axis of button travel 210 to define an inward-outward positioning (or X-coordinate) of the button body 207. Likewise, the preload force 214 can specifically constrain the button body 207 along the axis 212 to define an up-down positioning (or Y-coordinate) of the button body 207. In specific examples, the one or more biasing structures 208 can seat the button body 207 along at an additional axis (e.g., a longitudinal axis perpendicular to both the axis of button travel 210 and the axis 212) that defines the lateral or Z-coordinate positioning of the button body 207 in a standard Cartesian coordinate system.

In some examples, the case 102 can include a seal 216. A seal can include a barrier, deterrent, wall, blockage, stop, pad, ring, or similar structure that can inhibit an object's progress along a path. In this disclosure, a seal in connection to the case 102 can particularly inhibit contaminant ingress (e.g., particles, fluids, oils, etc.) between the device housing 200 and the case body 202. Contaminant ingress, if uninhibited, could potentially lend to build-up or an induced air gap at the contact interface 218 that can interfere with or reduce reliability of sensing through button 104.

The seal 216 can include one or more of a variety of materials. For example, the seal 216 can include a compressible material (e.g., a foam, rubber, thermoplastic, silicone, gel, granular material, powder, liquid, gas, etc.) that can deform, flatten, squish, mold around, envelop, condense, or compact. Other materials are also contemplated. For example, the seal 216 can include a composite material, a molded material, a thermoplastic material (e.g., thermoplastic polyurethane), etc.

In some examples, the seal 216 can inwardly protrude from an inward-facing surface of the case body 202 (or a piece of a button mounting assembly affixed to the case body 202). In addition, the seal 216 can contact the device housing 200 when the computing device 106 is engaged with the case 102 as shown. Thus, the seal 216 can space away the interior surface 204 of the case body 202 from the device housing 200 of the computing device 106. As the case body 202 is brought against the device housing 200, the seal 216 can compress or deflect in some examples. For instance, in at least one example, the seal 216 can compress to a position that enables the button 104 and the device button 108 to remain in continuous (e.g., persistent or substantially persistent) and even (e.g., equidistant across its dimensions) contact at the contact interface 218.

In these or other examples, the seal 216 and the one or more biasing structures 208 can have interplay—particularly a force interaction upon the button 104 affecting contact with the device button 108. To illustrate, the seal 216 can press inward against the device housing 200 (parallel to the axis of button travel 210). If the seal 216 is too rigid, the seal 216 may overly bias the device housing 200 away from the case body 202 and therefore bias the device button 108 away from and out of contact with the button 104 (and/or counteract the desired preload force 214 by the biasing structures 208). Conversely, if the seal 216 is too pliant and compressible, the seal 216 may be less effective in functioning as a standoff or positioning aid to help position the case body 202 relative to the device housing 200 (e.g., in the X-direction). The seal 216 can therefore be compressible such that the button 104 can apply the preload force 214 from the one or more biasing structures 208 to the device button 108, and the preload force 214 is within a target range of force values (described above). Also, the seal 216 can have a balanced level of compressibility so that the seal 216 is functional to inhibit contaminant ingress and help position the case body 202 relative to the device housing 200.

In at least some examples, the seal 216 can surround a perimeter of the opening 203 defined by the case body 202. Additionally or alternatively, the seal 216 can surround a perimeter of the button 104. In one or more examples, a perimeter seal can include a complete or continuous seal (e.g., a 360-degree seal in the Y-Z plane around the opening 203 and/or the button 104). In this manner, the seal 216 can inhibit contaminant ingress between the device housing 200 and the case body 202 from proceeding beyond the seal 216 along the Y- or Z-axes to foul-up the contact interface 218.

Any of the features, components, parts, including the arrangements and configurations thereof shown in FIG. 2 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 2.

Figure 3A:
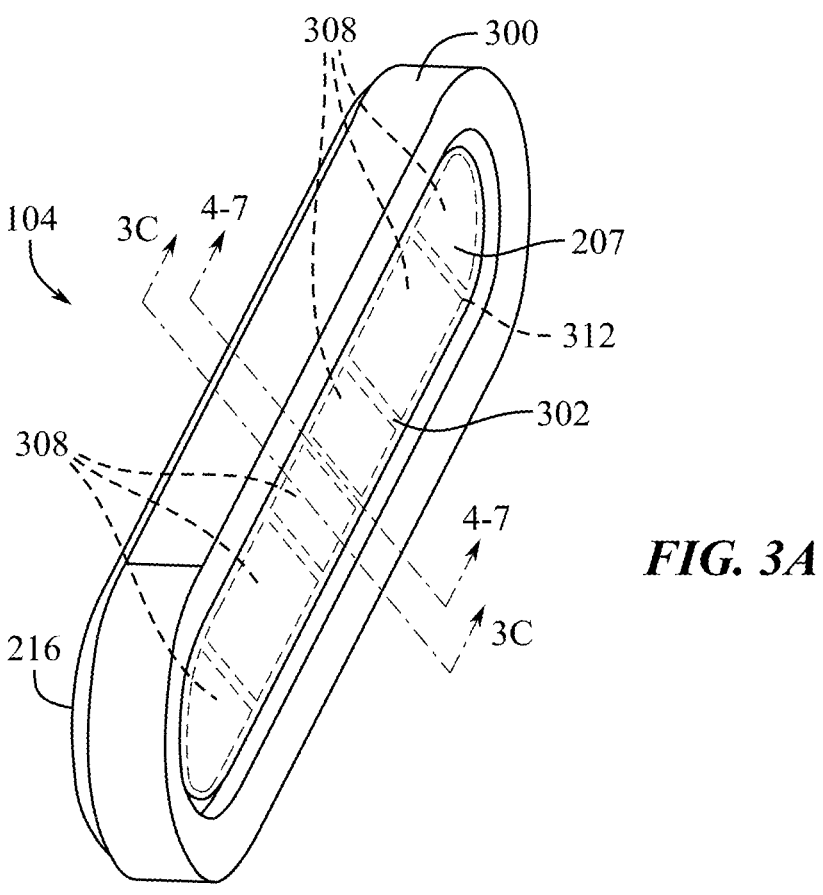
FIGS. 3A-3B illustrate perspective view of an example case button in accordance with one or more examples of the present disclosure.
Figure 3B:
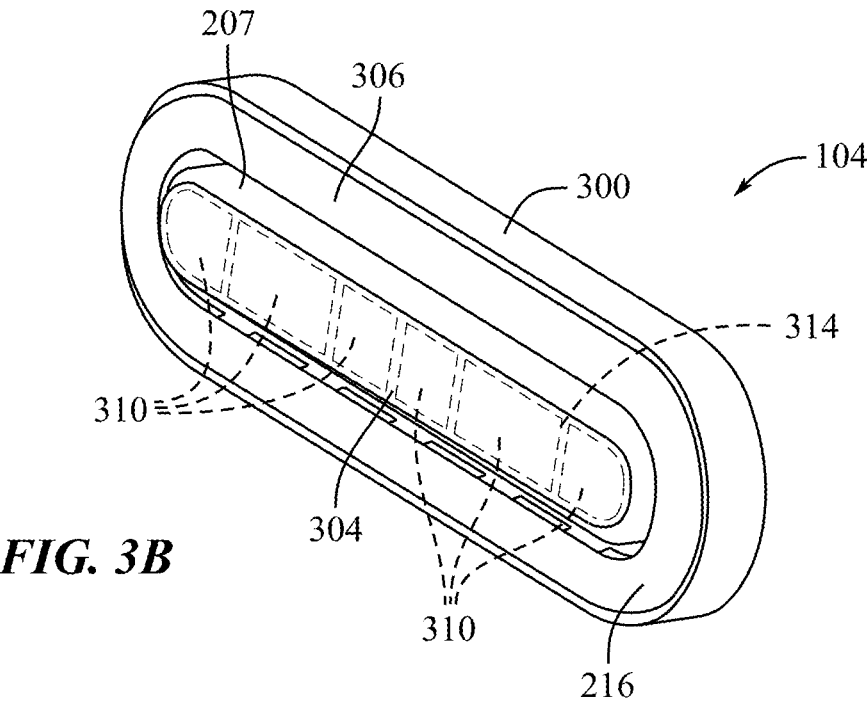

FIGS. 3A-3B illustrate perspective views of the button 104 in accordance with one or more examples of the present disclosure. In particular FIG. 3A illustrates an outer perspective view of the button 104, and FIG. 3B illustrates an inner perspective view of the button 104.

As shown, the button 104 can include a button mounting piece 300 that is attachable (e.g., via adhesive, spot welding, fasteners, etc.) to the case body 202. In some examples, the button mounting piece 300 can include a bracket, holder, support, or retention element (e.g., for retaining the button body 207 relative to the case body 202). That is, in particular examples, the button mounting piece 300 is configured to be affixed to the case body 202 with the case body 202 surrounding the outer perimeter of the button mounting piece 300, and the case body 202 can move relative to the button mounting piece 300 (e.g., in response to user inputs at the button body 207). In at least some examples, the button mounting piece 300 bridges together the case body 202 and the button body 207 (e.g., such that a user's finger can swipe across the button mounting piece 300 and onto the button body 207 without a perceivable gap). In some embodiments, the button mounting piece 300 is integrated with the case body 202 and is part of the case body 202. The button mounting piece 300 can be referred to as a frame, button guide, or a case mounting portion of the button 104.

In some examples, the button mounting piece 300 can include one or more materials. In certain implementations, the button mounting piece 300 includes the same or similar material as the case body 202. In other examples, the button mounting piece 300 includes a different material than the material of the case body 202. In particular implementations, the button mounting piece 300 includes a polycarbonate material.

Further shown, the button 104 can include a cap 302. The cap 302 can be attached to, or part of, a top portion of the button body 207. The cap 302 can include one or more materials. In some examples, the cap 302 includes a high dielectric material (e.g., a material having a dielectric constant greater than 10). In this manner, the cap 302 can allow electric flux or a charged electric field to pass or proceed between the cap 302 and an abutment surface 304 on the opposite side of the button body 207 (e.g., such that the device button 108 in contact with the abutment surface 304 can capacitively couple the computing device 106 and the button 104 for detecting user inputs at or near the cap 302). In certain implementations, the cap 302 can include high dielectric materials such as, for example, a zirconium material, a silicate material, a sapphire material, a ceramic material, a glass material, halfnium-based materials, a plastic or polymer material, or combinations thereof. Additionally or alternatively, the cap 302 can include a coating and/or a doped material having predetermined dielectric attributes.

As mentioned, the button body 207 can have the abutment surface 304 positioned opposite the cap 302. The abutment surface 304 can contact (e.g., persistently contact or substantially entirely abut) the device button 108 of the computing device 106 when the computing device 106 is disposed within the case 102. In these or other examples, the various structures of the button 104 can allow and facilitate moving and/or holding the abutment surface 304 to maintain such contact with the device button 108 of the computing device 106 (e.g., such that there is no air gap between the abutment surface 304 and the top surface of the device button 108 and that the abutment surface 304 and the top surface of device button 108 are in face-to-face engagement with each other).

The abutment surface 304 can be defined a variety of different structures of the button 104. In some examples, the abutment surface 304 can be an exterior surface of the second set of regions 310 on the button 104 (as further discussed below). In other examples, the abutment surface 304 can be defined on a different structure (e.g., on a cosmetic cover over the regions 310, on a solder mask 322, or other button structure positioned at the innermost end of the button 104 that would face and contact the device button 108).

Figure 3C:
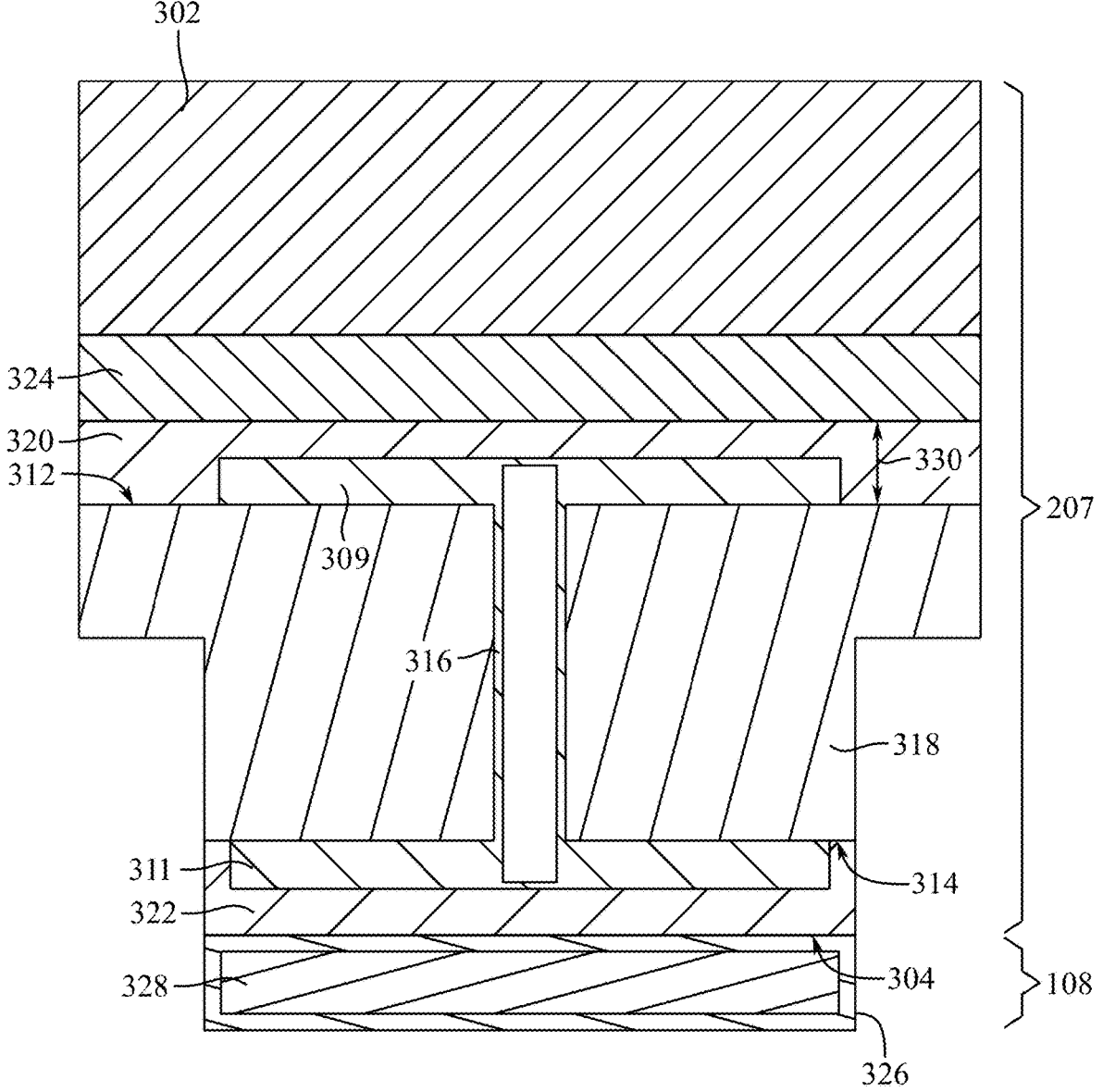
FIG. 3C illustrates a cross-sectional view of a button body positioned against a device button in accordance with one or more examples of the present disclosure.

In addition, the button 104 can include a first set of regions 308 and a second set of regions 310. The first set of regions 308 can be outer-facing regions disposed on an exterior surface of the cap 302. Alternatively, the first set of regions 308 can be disposed below the cap 302 (e.g., on top of or embedded in a substrate surface as shown in FIG. 3C). Similarly, the second set of regions 310 can be inner-facing regions disposed on a surface opposite of the first set of regions 308. For example, the second set of regions 310 can be disposed on the abutment surface 304. In other examples, the second set of regions 310 can be disposed underneath the abutment surface 304 (e.g., on the bottom of or embedded in a device-facing side of a substrate surface as shown in FIG. 3C).

In some examples, the first set of regions 308 and the second set of regions 310 can include bounded regions (e.g., that include conductive pads as discussed more below in relation to FIG. 3C). In other examples, the first set of regions 308 and the second set of regions 310 can include regions or general areas of the button body 207 (e.g., portions, segments, halves, thirds, quarters, layers, etc.). That is, the first set of regions 308 and the second set of regions 310 are not limited to physically separate areas or discrete structures (e.g., conductive pads). Instead, the first set of regions 308 and the second set of regions 310 can include various surface regions or delineations—whether arbitrary, pre-defined, or otherwise—that may not necessarily be physically spaced apart from each other by gaps (e.g., as with the input regions 1102 and the receptor regions 1106 discussed below in relation to FIGS. 11A-11B) and can therefore share edges or borders with each other.

In these or other examples, the first set of regions 308 and the second set of regions 310 can be charge coupled through the button 104. As used herein, the term "charge coupled" refers to an ability of a structure or a physical property of the structure to transfer electric charge between corresponding pairs of a set of structural elements, surfaces, or regions (e.g., between an first individual region of the first set of regions 308 and a second individual region of the second set of regions 310) without also transferring the electric charge in the same fashion/magnitude to one or more other structural elements, surfaces, or regions of the structure. Thus, a structure that permits charge coupling, in response to a user input (e.g., user appendage touch) applying charge or an electric field to one of the structural elements, surfaces, or regions causes a corresponding charge or electric field concentrated as a corresponding second structural element, surface, or region on the structure (e.g., on the opposite side from where the user input is applied). Charge coupling in particular is configured to provide region-specific transfer of electric charge, unlike a solid piece of metal material (e.g., with an infinite dielectric constant) that would wholly distribute and transfer electric charge equally or with substantially equal magnitude across the entire piece of metal material, irrespective of which specific part of the metal material was touched, especially when dealing with small, button-sized pieces of metal material. In this manner, the second set of regions 310 can be respectively charge coupled to the first set of regions 308 such that a transfer of electrical charge is configured to be transferred between a particular region of the first set of regions 308 and a particular region of the second set of regions 310 with the location of the input of the electrical charge at the first set of regions 308 being identifiable by the charge or electric field sensed at the second set of regions 308. Thus, in some examples, a first region of the first set of regions 308 can have a direct (e.g., 1-to-1 or substantially so) correspondence of electrical charge transfer with a first region of the second set of regions 310, and a second region of the first set of regions 308 can have a direct (e.g., 1-to-1 or substantially so) correspondence of electrical charge transfer with a second region of the second set of regions 310.

Additionally or alternatively, in some examples, one or more adjacent regions of the first set of regions 308 (or the second set of regions 310) can have blended charge coupling such that adjacent regions can transfer part of an electrical charge. For example, in response to a user input at a first region of the first set of regions 308, charge transfer can occur between the first region of the first set of regions 308 and a first region of the second set of regions 310. In addition, a partial charge transfer can occur—albeit to a lesser degree—between a region adjacent to the first region of the first set of regions 308 and a corresponding region adjacent to the second region of the second set of regions 310. That is, electric charge transfer between two regions can bleed into adjacent regions. Thus, in some embodiments, charge coupling can be region-specific (or region independent) but still affects neighboring regions to a lesser extent. Signal processing algorithms can be applied to multiple signals detected by multiple capacitive sensors of the computing device 106 to calculate the estimated position of the source of the input (e.g., the user's fingertip location relative to the first set of regions 308) based on techniques known to those having skill in the art and having the benefit of the present disclosure.

Additionally shown, the seal 216 is positioned and arranged to protrude from the button mounting piece 300. For example, the seal 216 can protrude inward relative to the button mounting piece 300. In these or other examples, the seal 216 can include an innermost surface 306 parallel to the abutment surface 304. The innermost surface 306 can extend inward past the button mounting piece 300 and, in some examples, extend inward past the abutment surface 304 (e.g., to contact and compress against the device housing 200). In other examples, the innermost surface 306 is substantially flush with (e.g., coplanar with) the abutment surface 304.

It will be appreciated that the button 104 can include a variety of different button sizes and shapes. In particular examples, the button 104 is sized and shaped to be congruent (or substantially so) with the device button 108. In some cases, the shape of the button 104 can be slightly smaller than the device button 108 in its length and width so as to not overlap or exceed the perimeter of the device button 108. In at least some examples, the button 104 includes a lozenge shape (e.g., an elongated pill shape), square, rectangle, circle, oval, or other polygonal shape.

Any of the features, components, parts, including the arrangements and configurations thereof shown in FIGS. 3A-3B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 3A-3B.

FIG. 3C illustrates a cross-sectional view of the button body 207 positioned against the device button 108 in accordance with one or more examples of the present disclosure. As shown, the button body 207 can include a region of the first set of regions 308 and a region of the second set of regions 310 (in this instance, a conductive pad 309 for one of the first set of regions 308 and another conductive pad 311 for one of the second set of regions 310). In relation to FIGS. 3C-3E, the first set of regions 308 and the second set of regions 310 will be referenced as a first set of pads 309 and a second set of pads 311, respectively, or individually as an outer pad 309 and an inner pad 311.

The term "pads" or "conductive pads" can refer to plates, panels, sheets, layers, electrical contacts, signal receptors, signal receivers, etc. Pads can be used to transfer electric charge between one side of the button body 207 and the other side of the button body 207. In particular, pads can be used to transfer electric charge between specific regions of the button body 207 on opposing sides of the button body 207.

To illustrate, the outer pads 309 can be positioned on or embedded within a first surface 312 of the button body 207, namely a top surface of a substrate 318. The inner pads 311 can be positioned on or embedded within a second surface 314 of the button body 207, namely a bottom surface of the substrate 318 opposite the first surface 312. Accordingly, the pads 309, 311 can be parallel relative to each other. Additionally, the pads 309, 311 can be substantially aligned relative to each other (as will be discussed more below in relation to FIGS. 3D-3E). Further, the inner pads 311 can be aligned with sensor pixels (shown in the particular view of FIG. 3C as an individual sensor pixel 328) of a touch sensor 326 of the device button 108 when the electronic device 106 is engaged with the case 102.

The pads 309, 311 can include a variety of one or more materials. In some examples, the pads 309, 311 can include a conductive material. Some specific implementations of a conductive material can include copper, gold, aluminum, silver, iron, similar conductors, and combinations thereof.

Conductors 316 can extend through the button body 207 and electrically couple corresponding pairs of the pads 309, 311. Conductors can include strands, pillars, rods, electrical connectors, electrical pathways or traces, etc. Accordingly, the conductors 316 can allow instantaneous (or near instantaneous) transfer of electrical charge between the pads 309 and the pads 311. As a result, the transfer of electric charge from an outer pad 309 to an inner pad 311 can largely occur through the conductors 316 (as opposed to occurring through other portions of the button body 207, such as the substrate 318, which are electrically insulative or have a low dielectric constant). In these or other examples, the conductors 316 can include a conductive material (e.g., copper, gold, aluminum, silver, iron, or another material similar to the pads 309, 311). In certain implementations, the conductors 316 include a hollow interior portion.

In one or more examples, a substrate 318 is positioned around the conductors 316, thereby defining an insulating (e.g., electrically insulating) barrier spacing apart the conductors 316 and pads 309, 311. The substrate 318 can include a variety of one or more materials. Some particular examples of material can include material for printed circuit boards, such as FR4 that includes fiberglass reinforced epoxy-laminated sheets. The top and bottom surfaces of the substrate 318—namely the first surface 312 and the second surface 314—can be respectively attached to the pads 309, 311 as discussed above.

In some examples, one or more layers are positioned over the pads 309. For example, the cap 302 (such as sapphire cap) may be positioned over the pads 309. As another example, an adhesive layer 324 can be positioned over the pads 309 (e.g., to adhere the cap 302 to at least one of the pads 309 or a solder mask 320). In yet another example, a solder mask 320 can be positioned over and around the pads 309. The solder mask 320 can, in certain implementations, entirely encapsulate the pads 309 (e.g., to electrically isolate the different pads 309 on the first surface 312). Additionally or alternatively, the solder mask 320 can conceal the pads 309. For instance, the solder mask 320 can include an opaque, colored material (e.g., a cosmetic layer) that covers the pads 309 to prevent visibility of the pads 309 from an external viewer of the button 104.

The solder mask 320 can also include a thickness 330 designed to limit signal loss (e.g., loss of capacitance signal/electric field strength through the solder mask 320). In these or other examples, the thickness 330 can be less than 10 micrometers. In particular examples, the thickness 330 is between about 1 and about 9 micrometers, between about 2 and about 8 micrometers, or between about 4 and about 7 micrometers.

A solder mask 322 can be similarly positioned over and around the inner pads 311. The solder mask 322 can electrically isolate the different pads 311 on the second surface 314 and/or conceal the pads 311 (e.g., as another cosmetic layer). The solder mask 322 can also include a same or similar thickness tuned to minimize or reduce signal loss. In some examples, the solder mask 322 forms an abutment surface (e.g., the abutment surface 304) for contacting the touch sensor 326.

The dielectric constant of the various materials of the button body 207 can also be considered for various thickness and dimensional tuning. In some examples, the adhesive layer 324 can include a dielectric constant between about 1 and about 5, between about 2 and about 4, or about 3. In certain implementations, the solder masks 320, 322 can similarly include a dielectric constant between about 1 and about 5, between about 2 and about 4, or about 3. In particular examples, the substrate 318 can also a dielectric constant between about 1 and about 6, between about 2 and about 5, or about 4.

The touch sensor 326 can include or be operable with one or more sensors (e.g., a switch sensor, a force sensor, a capacitance sensor, etc. as described more below in relation to FIG. 13) of the device button 108. The touch sensor 326 can be configured to positionally identify a user input at the button body 207 (e.g., relative to at least one sensor pixel 328). Additionally or alternatively, the touch sensor 326 can emit an electric field, which is transmittable through the sensor pixels 328, the pads 311, the conductors 316, and the pads 309.

To perform these and/or other functions, the touch sensor 326 can include one or more sensor pixels 328 disposed on or within the touch sensor 326. The sensor pixels 328 can include electrodes, measurement areas, sensing regions, capacitive plates, electrical contacts, circuitry, transducers, force-dependent resistors, signal receptors, receivers, etc. In these or other examples, each sensor pixel of the sensor pixels 328 can be overlapped by the pads 311 (e.g., such that each sensor pixel of the sensor pixels 328 is respectively charge coupled to a corresponding one of the pads 311). Thus, the sensor pixels 328 can sense a particular electrical charge signature, such as a specific change in capacitance or electric field strength distribution, that indicates a user input was applied to a specific location on the button body 207.

Figure 3D:
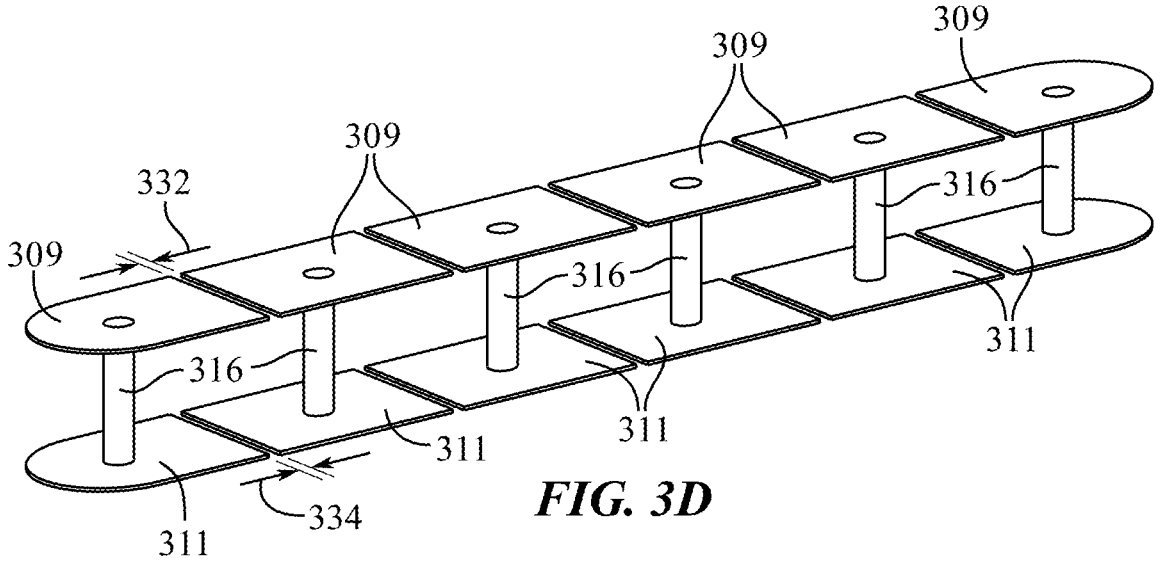
FIGS. 3D-3E respectively illustrate example implementations of pads and associated conductors in accordance with one or more examples of the present disclosure.
Figure 3E:
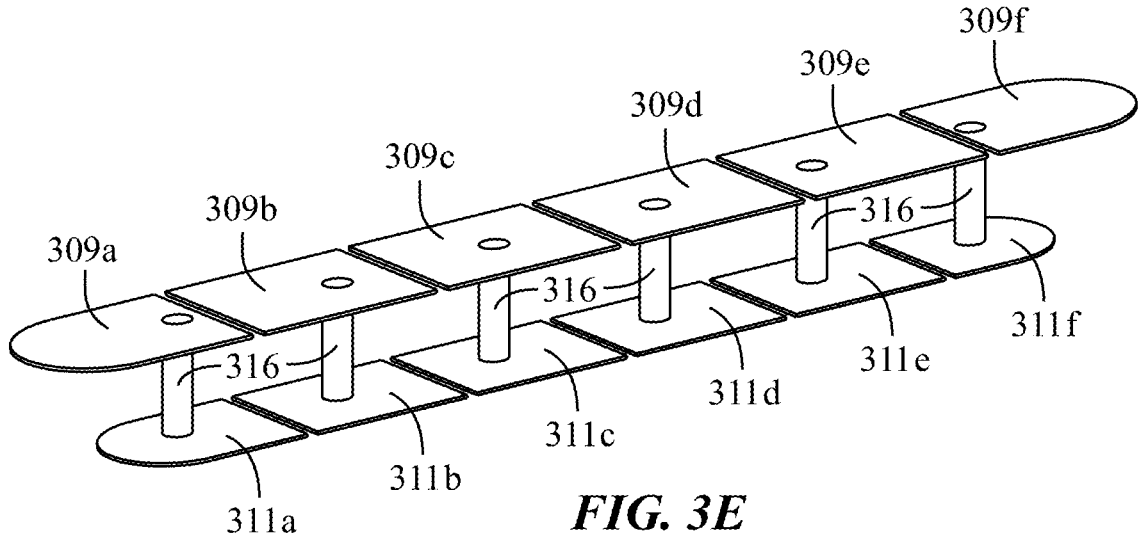

FIGS. 3D-3E respectively illustrate example implementations of the pads 309, 311 and associated conductors 316 in accordance with one or more examples of the present disclosure. In these figures, substrate 318 and other components of the button 104 are omitted. As shown, the pads 309 can be aligned relative to the pads 311. For example, and as depicted in FIG. 3D, the pads 309 can be situated directly over/overlapping the pads 311 (e.g., such that the conductors 316 are centrally positioned in each of the pads 309 and the pads 311 and that the edges of each outer pad 309 are aligned with the edges of a respective inner pad 311). In other examples, some of the outer pads 309 are at least partially offset relative to the inner pads 311 or have their edges extending to positions beyond or non-overlapping with their respective charge coupled inner pads 311. For instance, and as depicted in FIG. 3E, a portion of the pads 309a, 309f respectively extend beyond the pads 311a, 311f.

In these or other examples, at least one of the pads 309 can be larger than the pads 311. For example, the pads 309a, 309f can be larger than the pads 311a, 311f (e.g., between 5% and 50% larger, between 10% and 40% larger, between 15% and 25% larger, or between 20% and 30% larger). In some examples, a larger surface area of one or more of the pads 309 (compared to a surface area of the pads 311) can help boost signal detection by the touch sensor 326. The outer end pads 309a, 308f in particular can be larger than the inner end pads 311a, 311f so that the pads 311a, 311f are not positioned too close to an electrical ground of the electronic device 106 (discussed more in relation to FIG. 9).

Further shown, the pads 309 (including each of the pads 309a-309f in FIG. 3E) can be separated by a gap 332 (e.g., an air gap or other an insulating spacing between each other). Similarly, the pads 311 (including each of the pads 311a-311f in FIG. 3E) can be separated by a similar gap 334. In some examples, the gaps 332 between the pads 309 and the gaps 334 between the pads 311 are equivalent. In other examples, the gaps 332 between the pads 309 and the gaps 334 between the pads 311 are different. In these or other examples, the gaps 334 and the gaps 332 can be custom tailored such that some gaps differ from each other (e.g., to induce a particular signal detection sensitivity). For instance, pads can have a particular location and size (relative to other pads), which in some examples can necessitate a particular gap between pads (e.g., so as to equalize a signal detection sensitivity across a group of pads). As another example, the gaps 334 and the gaps 332 can differ (or otherwise be customized) such that pads of differing sizes do not overlap with other neighboring pads oppositely positioned (e.g., a large pad of the pads 309 does not overlap with a smaller pad of the pads 311 adjacent to a pad 311 directly across from the larger pad).

In at least some examples, the gaps 332 can be aligned with the gaps 334. In other examples, the gaps 332 and the gaps 334 can be at least partially unaligned. For example, one or more of the gaps 334 can be larger (and therefore at least partially unaligned) relative to the gaps 332 in some instances where one or more of the pads 309, 311 have differing sizes. In particular implementations, the gaps 334, 332 can be unaligned where signal detection sensitivity is customized for one or more pads.

In these or other examples, the gaps 332 and the gaps 334 can be sized to aid electrical isolation between pads. In particular examples, the gaps 332 and the gaps 334 range between 0.02 millimeters and 5 millimeters, between 0.1 millimeters and 4 millimeters, between 0.5 millimeters and 3 millimeters, or between 1 millimeter and 2 millimeters.

Figure 3F:
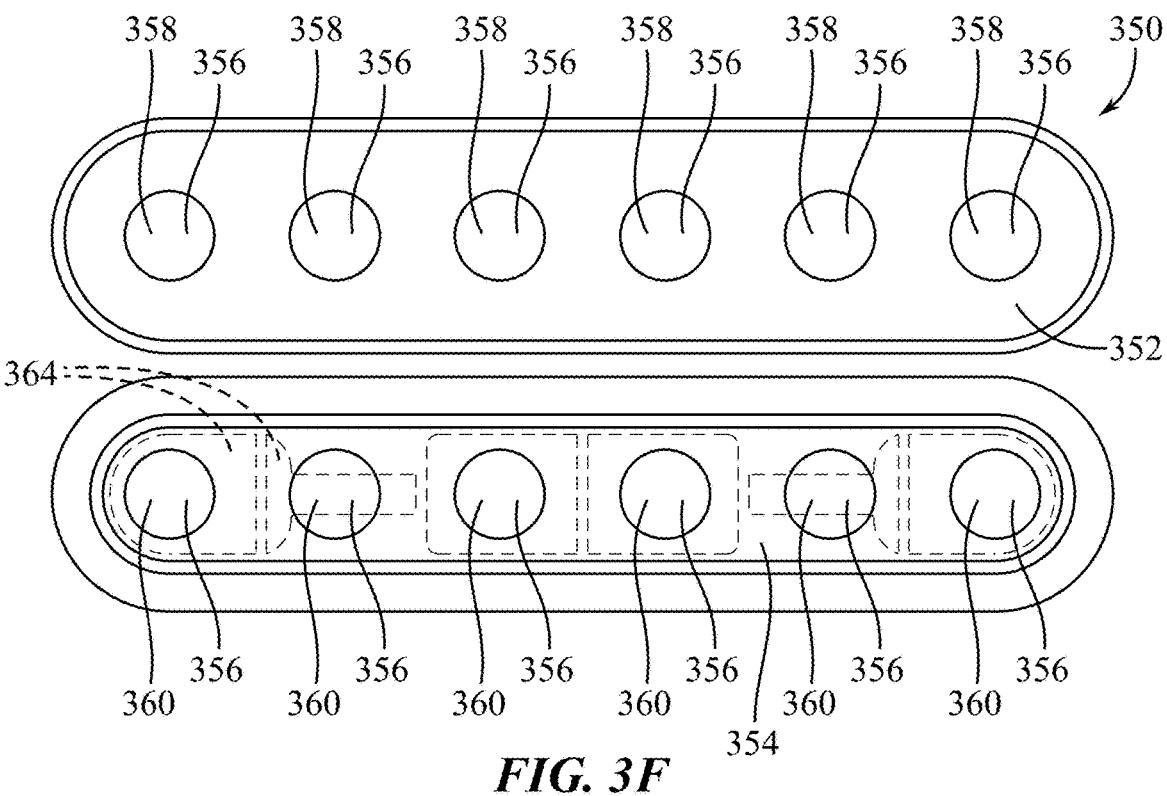
FIGS. 3F-3G illustrate an example button including conductors in accordance with one or more examples of the present disclosure.
Figure 3G:
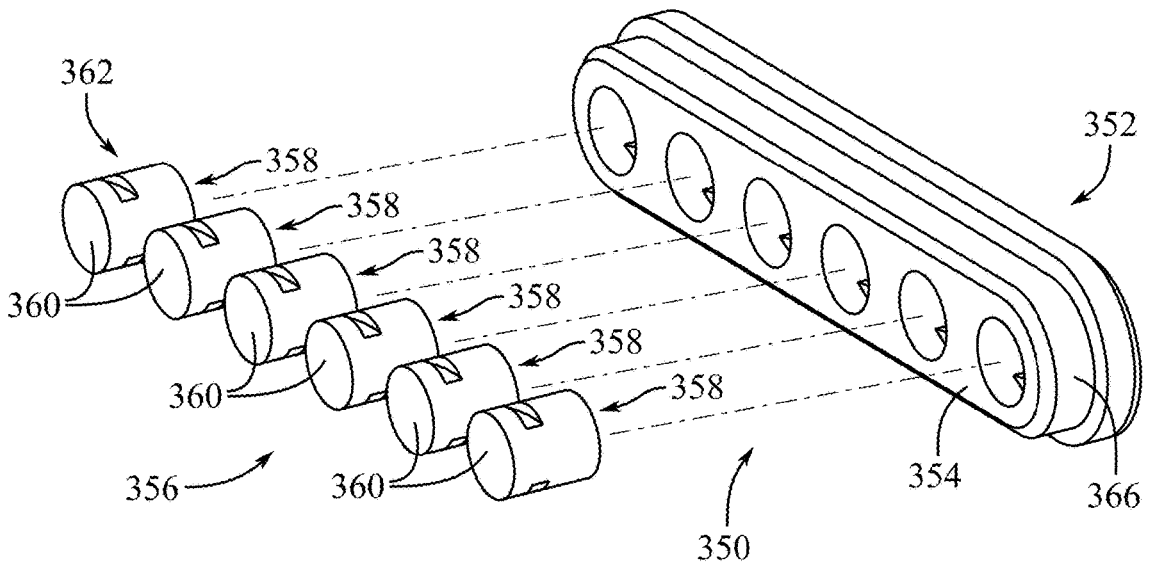

As mentioned above, a case button of the present disclosure is not limited to pads. In some examples, a button body can include conductors but no pads on at least the outer-facing surface. In such examples, the conductors themselves are both the electrical conduit and the input region for transferring electric charge through the button body. In accordance with one or more such examples, FIGS. 3F-3I illustrate buttons 350, 370. As shown in FIGS. 3F-3G, in particular, the button 350 can include a core portion 366 (e.g., a body portion, main portion, etc.) defining a first surface 352 and a second surface 354 opposing the surface 352. In FIG. 3F, a view of the outer side/input side of the button 350 is shown, with surface 352 facing outward, above a view of the inner side/receptor side of the button 350, with surface 354 facing inward.

The button 350 can additionally include a plurality of conductors 356 (e.g., electrical connectors or pillars) extending through the core portion 366 between the first/outer surface 352 and the second/inner surface 354. The conductors 356, like the conductors 316, can include a variety of one or more conductive materials (e.g., gold, copper, silver, iron, aluminum, stainless steel, etc.). In particular implementations, the conductors 356 include at least one of an aluminum material or a stainless steel material.

The conductors 356 can include a variety of shapes and sizes (and quantities, as seen in FIGS. 3F-3I). In particular examples, the conductors 356 can each include a cylindrical shape in the form of a conductive pillar.

In some examples, end portions 358, 360 of the plurality of conductors 356 can define the first set of regions 308 and the second set of regions 310, respectively. For example, the end portions 358, 360 can include surfaces that are coplanar with the surface 352 and the surface 354, respectively, such that the end portions 358 can constitute input regions receptive to touch inputs and the end portions 360 can constitute receptor regions for receiving signals from the end portions 358 and/or a device button of an electronic device.

It will be appreciated that, in certain implementations, the end portions 358, 360 are not directly exposed to a user touch. Likewise, in some examples, the end portions 358, 360 may not necessarily be visible to a user, but instead can be concealed. For example, the end portions 358, 360 can be concealed by a cosmetic layer, a cap material or a high dielectric material (e.g., a material having a dielectric constant greater than 10), or one or more pads. To illustrate, the end portions 360 of the conductors 356 can be electrically coupled to pads 364 disposed on the device button (e.g., 108) below/internal to the inner surface 354. In some embodiments, the pads 364 can be part of the button 350 and disposed on the inner surface 354, similar to the inner pads 311 discussed above, as shown by the broken lines in FIG. 3F. In some examples, the pads 364 can include a non-uniform pad size (e.g., to tune a signal sensitivity, enhance position detection accuracy, etc.). The shapes of the pads 364 can also be configured to correspond in size and shape to respective pads of the device button 108.

Between the end portions 358, 360, each of the conductors 356 can include an intermediate portion 362. The intermediate portion 362 can include a middle portion disposed between the end portions 358, 360. The intermediate portion 362 can be encapsulated by the core portion 366 (e.g., such that the intermediate portion 362 is not exposed at the surfaces 352, 354). To encapsulate the intermediate portion 362, the conductors 356 can be press-fit into the core portion 366, bonded or fastened in place within the core portion 366, or else formed via casting or molding methods. In certain implementations, the core portion 366 itself can be molded or formed around the conductors 356.

Figure 3H:
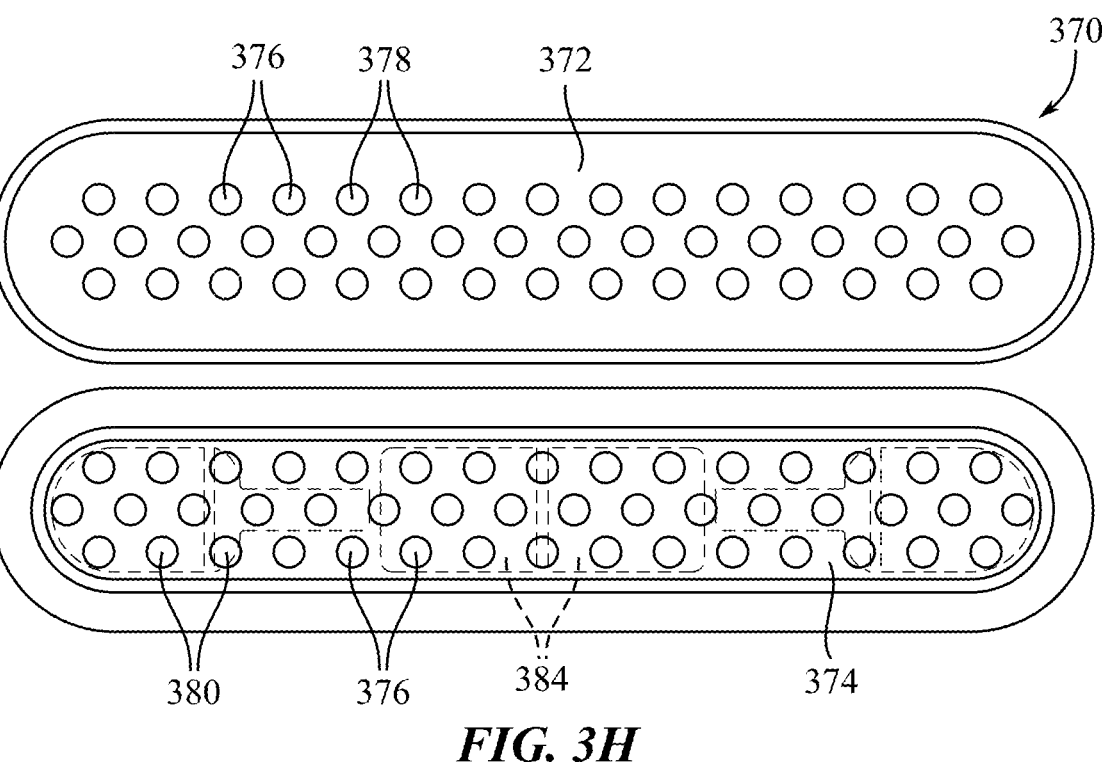
FIGS. 3H-3I illustrate another example button including conductors in accordance with one or more examples of the present disclosure.
Figure 3I:
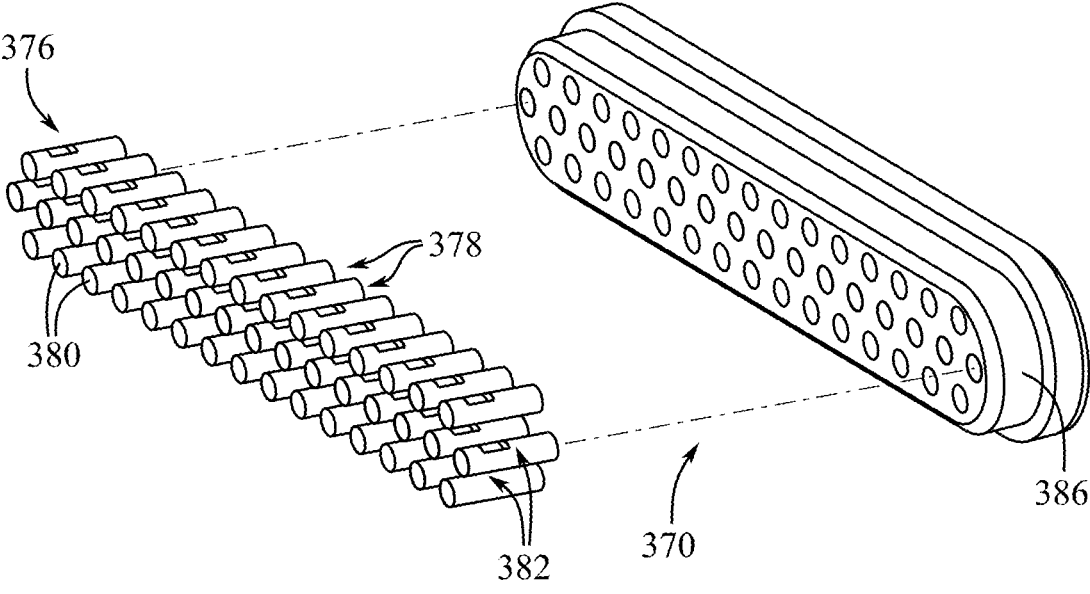

FIGS. 3H-3I are similar views to FIGS. 3F-3G and depict a button 370 in accordance with one or more examples of the present disclosure. The button 370 can include one or more of the same or similar features just described in relation to FIGS. 3F-3G. For example, the button 370 can include a core portion 386 defining a surface 372 and a surface 374 opposing the surface 372. Differently, however, the button 370 can include conductors 376, which include multiple rows of conductors. The conductors 376 can be the same as or similar to the conductors 356, albeit a smaller size. The conductors 376 can, for instance, similarly include end portions 378, 380 that are coplanar with the surfaces 372, 374 and/or are at least partially concealed. Likewise, the conductors 376 can include an intermediate portion 382 encapsulated by the core portion 386. In some examples, pads 384 can be electrically coupled to the end portions 380, as similarly discussed above.

It will be appreciated that the conductors 356, 376 of the buttons 350, 370 can be arranged in a variety of configurations. Although shown in single and multiple row configurations, respectively, other configurations are herein contemplated. For example, the conductors 356, 376 can be arranged in various patterns, groupings, shapes, clusters, etc.

Any of the features, components, parts, including the arrangements and configurations thereof shown in FIGS. 3C-3I can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 3C-3I.

Figure 4:
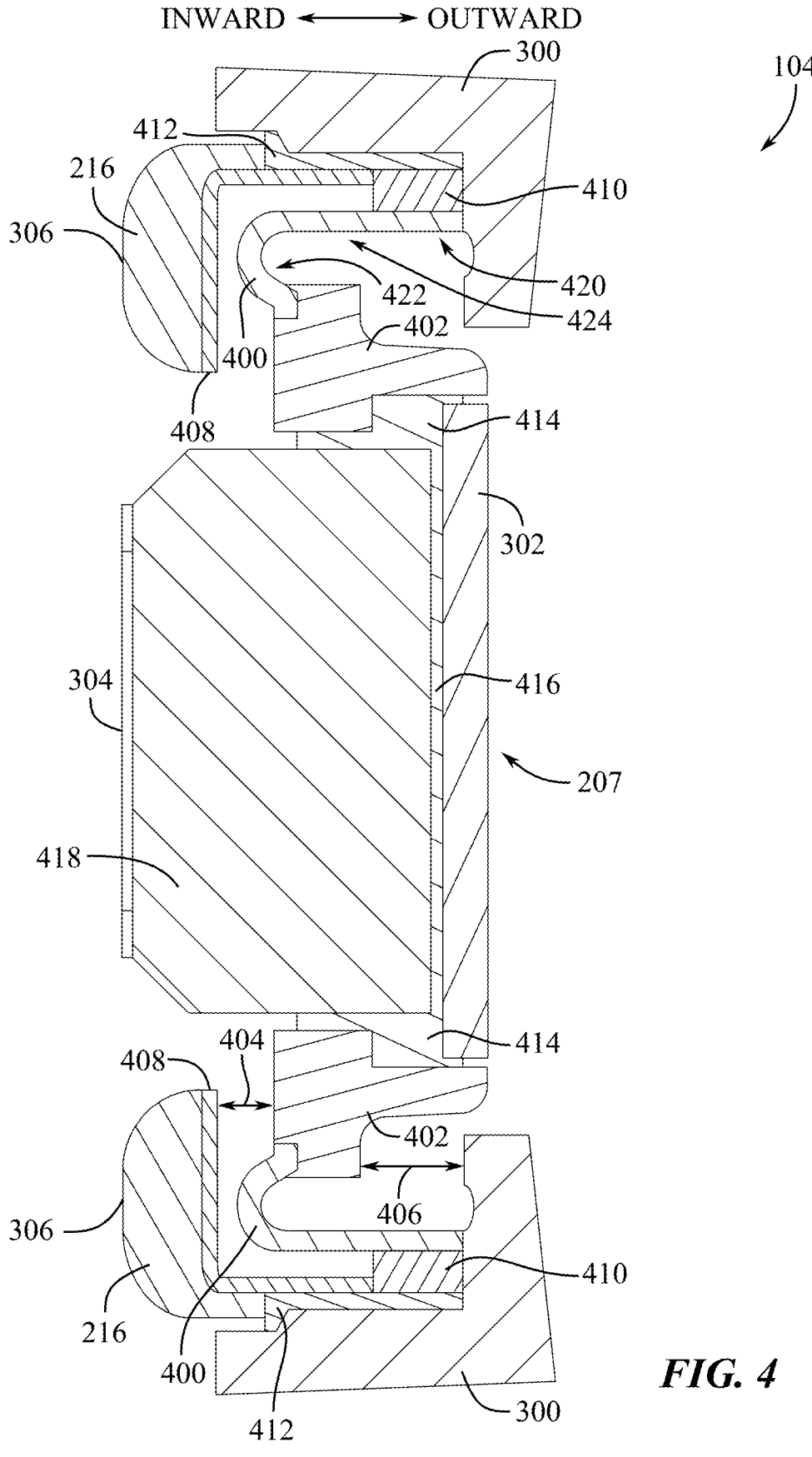
FIG. 4 illustrates a cross-sectional view of an example case button in accordance with one or more examples of the present disclosure.

FIG. 4 illustrates a cross-sectional view of the button 104 in accordance with one or more examples of the present disclosure. As shown, the button 104 can include a variety of internal structures that enable a floating implementation where the button body 207 is not rigidly bound to the button mounting piece 300. For example, the button 104 can include a seal 400. The seal 400 is one example implementation of the one or more biasing structures 208 discussed above in relation to FIG. 2. In these or other examples, the seal 400 can include an elastically compliant seal (e.g., a flexible seal, a movable seal, a bendable seal, etc.). Additionally or alternatively, the seal 400 can include a moldable seal, a malleable seal, or a workable seal. In at least some examples, the seal 400 includes a contaminant seal, such as a fluid seal, an air seal, a particle seal, etc. to at least partially block or reduce the ingress of certain contaminants. In certain implementations, the seal 400 is a fluid-tight seal (e.g., a full seal, a waterproof seal). Accordingly, the seal 400 can include a variety of one or more materials such as rubber, elastomer, polyurethane, neoprene, silicone, fluorocarbon, fluoropolymer, acrylate polymer, etc.

In these or other examples, the seal 400 can elastically apply a force (e.g., the preload force 214 discussed above) to the button body 207. In this manner, the seal 400 can bias the button body 207 inward through the opening (defined by the case body 202 and/or the button mounting piece 300 in which the button body 207 is disposed) toward and/or past the seal 216 to contact the device button 108 of the computing device 106. Furthermore, the seal 400 can positionally locate the button body 207 in three-dimensional space (e.g., along at least two perpendicular axes (e.g., the Y- and Z-axes, as described above for the one or more biasing structures 208)).

The seal 400 can be attached to the button body 207 in a variety of ways. In some examples, the seal 400 is connected to the button body 207 at one end, and the seal 400 is connected to the button mounting piece 300 (or the case body 202) at the other end. To illustrate, the seal 400 can include a first end 420 cantilevered from the button mounting piece 300 (or the case body 202), a second end 422 curved into the button body 207, and a middle portion 424 extending laterally inward and curving from the first end 420 toward the second end 422 to form a J-shape when viewed in cross-section. In certain implementations, this J-shaped cross-section of the seal 400 can impart one or more of the desired attributes discussed above in relation to the one or more biasing structures 208. In some examples, the first end 420 can be insert molded to a block 410 (which can be adhered to the button mounting piece 300 via adhesive 412). In certain implementations, the second end 422 includes a contact surface or end surface that contacts (and may attach to) the button body 207 via a button trim 402. For example, the second end 422 can be insert molded to the button trim 402 of the button body 207.

In some examples, the button trim 402 can include a frame or support member for positioning various components of the button body 207 relative to the button trim 402. In some examples, the button trim 402 can also define (e.g., limit or stop) a range of button travel, as indicated by ranges 404, 406. For instance, the button body 207 can flex inward such that the button trim 402 translates a distance corresponding to the inner button travel range 404 and is stopped by contact with an inner housing 408 (which can be adhered to the button mounting piece 300 via the adhesive 412). Similarly, the button body 207 can flex outward such that the button trim 402 translates a distance corresponding to the outer button travel range 406 and is stopped by contact with the button mounting piece 300. In some examples, the button trim 402 is attached to the cap 302 and a substrate 418 via adhesive 414.

Additionally shown, the seal 216 can line an inner surface of the inner housing 408. The inner housing 408 can provide support and rigidity to the seal 216. Additionally or alternatively, the inner housing 408 can position the seal 216 at a fixed distance and orientation relative to the button mounting piece 300 (and therefore relative to the case body 202 as well).

In some examples, an ink material 416 is positioned between the button body 207 (particularly the substrate 418) and the cap 302. An ink material can include a colorant, dye, pigmented fluid, stain, or color-enhancing substance. In certain implementations, a thickness of the ink material 416 can be minimized (e.g., due to lower dielectric qualities of the ink material 416). In this way, electric flux or a charged electric field can proceed between the cap 302 and an abutment surface 304 (including through the ink material 416).

Furthermore, as shown in FIG. 4, the button mounting piece 300 can comprise outward-facing surfaces surrounding the opening within which the button body 207 is located. The outward-facing surfaces can be angled or sloped toward the opening so as to funnel or guide input toward the input surface on the outward side of the cap 302. The angled or sloped nature of the surfaces can thereby help facilitate smooth movement of a user's appendage as it moves across the outside of the case, across the button mounting piece 300, onto the button body 207, back off of the button body 207 and onto the button mounting piece 300, and back onto the outside of the case. Facilitating smooth movement can help enable easier gesture or touch inputs to a computing device through the button body 207, even if the button body 207 is small (e.g., roughly the same width as a typical adult human fingertip or other appendage that would be expected to provide gesture or moving input against the button body 207).

Any of the features, components, parts, including the arrangements and configurations thereof shown in FIG. 4 can be included, cither alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 4.

Figure 5:
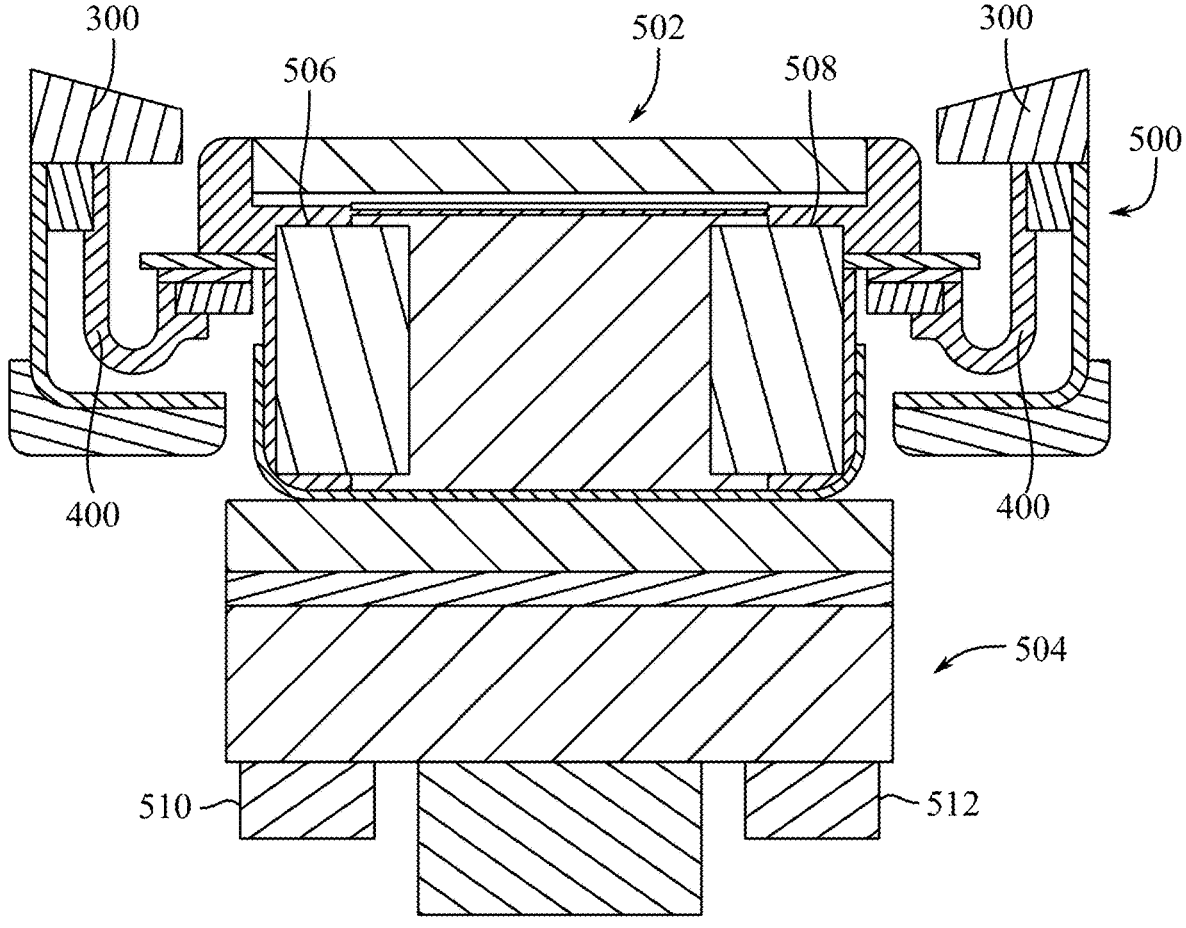
FIG. 5 illustrates a cross-sectional view of a button biased against a device button in accordance with one or more examples of the present disclosure.

As mentioned above, the one or more biasing structures 208 can include a variety of different types of biasing structures. In some examples, the one or more biasing structures 208 can include ferromagnetic material (e.g., permanent magnets, electromagnets, iron, steel or similar metals, similar magnetic materials, or combinations thereof). In accordance with one or more such examples, FIG. 5 illustrates a cross-sectional view of a button 500 biased relative to a device button 504 due to ferromagnetic materials of the button 500 and the computing device bearing the device button 504.

The button 500 can include one or more of the features described in the present disclosure, such as the button mounting piece 300 and/or the seal 400 previously discussed. As shown, the button 500 can include a button body 502 that includes ferromagnetic structures 506, 508. The ferromagnetic structures 506, 508 can be utilized to bias the button body 502 against the device button 504, which can include corresponding ferromagnetic structures 510, 512. The ferromagnetic structures 506, 508 of the button body 502 and the ferromagnetic structures 510, 512 of the device button 504 (or positioned adjacent thereto) can be magnetically attracted each other to hold the button body 502 against the device button 504.

A variety of magnetic configurations are herein contemplated. In some examples, a magnet of ferromagnetic structure 506 includes a "north" polarity configured to align with a magnet of ferromagnetic structure 510 that includes a "south" polarity. Additionally, a magnet of ferromagnetic structure 508 can include a "south" polarity configured to align with a magnet of ferromagnetic structure 512 that includes a "north" polarity. In other examples, however, the foregoing polarities can be opposite.

At least one of the ferromagnetic structures 506, 508, 510, 512 can be substituted with a ferromagnetic insert (e.g., a block, tab, or piece made of iron, steel, nickel, cobalt, etc.) that forms a magnetic attraction when placed within the magnetic field of a magnet of the other ferromagnetic structures. For example, the ferromagnetic structures 506, 508 can (as permanent magnets) be magnetically attracted to and align with ferromagnetic inserts positioned within the device button 504 where the ferromagnetic structures 510, 512 are shown. As another example, the ferromagnetic structures 510, 512 can (as permanent magnets) be magnetically attracted to and align with ferromagnetic inserts positioned within the button body 502 where the ferromagnetic structures 506, 508 are shown. Similarly, various ferromagnetic structures can include electromagnets, conductive coils, and similar structures for generating a controllable magnetic field usable to bias the button body 502 inward toward and against the device button 504.

In some examples, the implementation of magnets (and/or ferromagnetic inserts) can improve alignment and engagement between the button body 502 and the device button 504. For example, the implementation of magnets (and/or ferromagnetic inserts) can facilitate a zero-air-gap interface between the button body 502 and the device button 504 such that little or no air is found between the button body 502 and the device button 504 (thereby enhancing a charge coupling between the button body 502 and the device button 504). Further, in some examples, the implementation of magnets (and/or ferromagnetic inserts) can allow larger (i.e., looser) manufacturing tolerances of components. Additionally or alternatively, in certain implementations, magnets (and/or ferromagnetic inserts) can—instead of the seal 400—be used to bias the button body 502 against the device button 504. Such implementations can remove the manufacturing complexity of ensuring that the seal 400 provides an accurate amount of preload (e.g., a specific magnitude of applied force) to bias the button body 502 against the device button 504.

Any of the features, components, parts, including the arrangements and configurations thereof shown in FIG. 5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 5.

Figure 6:
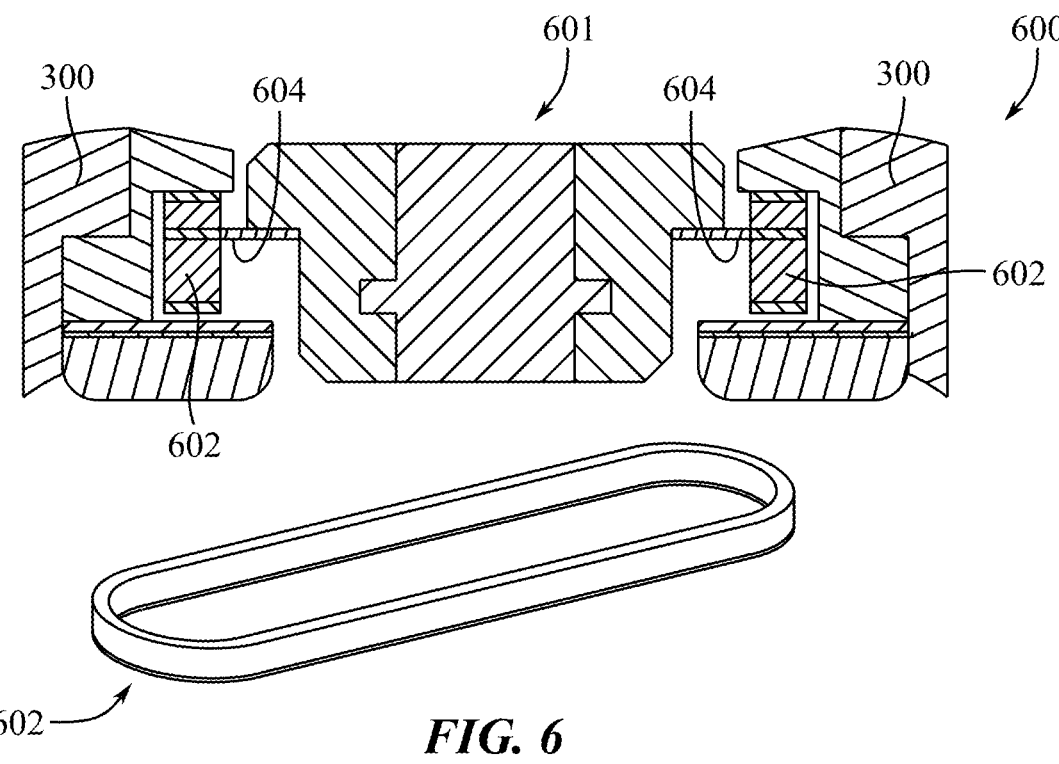
FIG. 6 illustrates a cross-sectional view of an example button and a perspective view of a biasing structure in accordance with one or more examples of the present disclosure.

As mentioned above, the one or more biasing structures 208 can include a variety of different types of biasing structures. In some examples, the one or more biasing structures 208 can include a foam biasing structure. In accordance with one or more such examples, FIG. 6 illustrates a cross-sectional view of a button 600 and a perspective view of a foam biasing structure 602. The button 600 can include one or more of the same or similar features discussed above.

As shown, the button 600 can include a button body 601 that is movable relative to the button mounting piece 300 (e.g., in response to a user input at the button body 601). In particular examples, the button body 601 is a floating button body that can be biased against a device button. In certain implementations, the button body 601 can be biased against a device button via a foam biasing structure 602.

The foam biasing structure 602 can include a foam insert that includes an open-cell and/or closed-cell structure. The foam biasing structure 602 can include a variety of shapes, sizes, and configurations. In particular examples, the foam biasing structure 602 can include a ring shape, a lozenge shape, a rectangular shape, etc. In certain implementations, the foam biasing structure 602 can include a size and shape that correlates with the size and shape of the button 600.

The foam biasing structure 602 can move in a variety of different ways (e.g., to dissipate applied forces, transfer applied forces etc.). In some examples, deformation or compression of the foam biasing structure 602 can follow a predetermined force-displacement curve as a user input applies a force to the button body 601. Similarly, the foam biasing structure 602 can apply a force (e.g., a preload force or a biasing force) to the button body 601 to seat the button body 601 against a device button on an electronic device due to elastic compression of the foam biasing structure 602.

In these or other examples, the foam biasing structure 602 can apply a preload force to the button body 601 via a plate 604 extending between the button body 601 and the foam biasing structure 602. Likewise, the button body 601 can transfer an applied force from a user input to the foam biasing structure 602 via the plate 604. In some examples, the plate 604 is adhered, bonded, welded, fastened, or otherwise attached to both of the button body 601 and the foam biasing structure 602. For example, a first end of the plate 604 can be attached to the button body 601, and a second end of the plate 604 can be attached to the foam biasing structure 602. In this manner, the plate 604 can link the button body 601 and the foam biasing structure 602 together.

In some examples, the foam biasing structure 602 can provide additional or alternative functionality. For example, an inner, lower portion of the foam biasing structure 602 can provide a spring-like force when the foam biasing structure 602 is at least partially compressed to urge the button body 601 outward and away from the device button (e.g., in response to the button body 601 being depressed into a device button). Accordingly, a compressed portion of the foam biasing structure 602 can cause the button body 601 to rebound back to its original position (prior to being depressed). Likewise, a portion (e.g., an outer, top portion) of the foam biasing structure 602 can be attached to the button mounting piece 300 and can stretch inward/downward toward the device button in response to a user input depressing the button body 601 (thereby inducing a tensile force in the outer/upper part of the foam biasing structure 602). Thus, the tensile force and the compressive force can cooperatively cause the button body 601 to positionally reset following a user input. Additionally, when the case having the button 600 is installed on a computing device, the outer, top portion of the foam biasing structure 602 can apply a preload force on the button body 601 to bias the button body 601 against the device button.

Any of the features, components, parts, including the arrangements and configurations thereof shown in FIG. 6 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 6.

Figure 7:
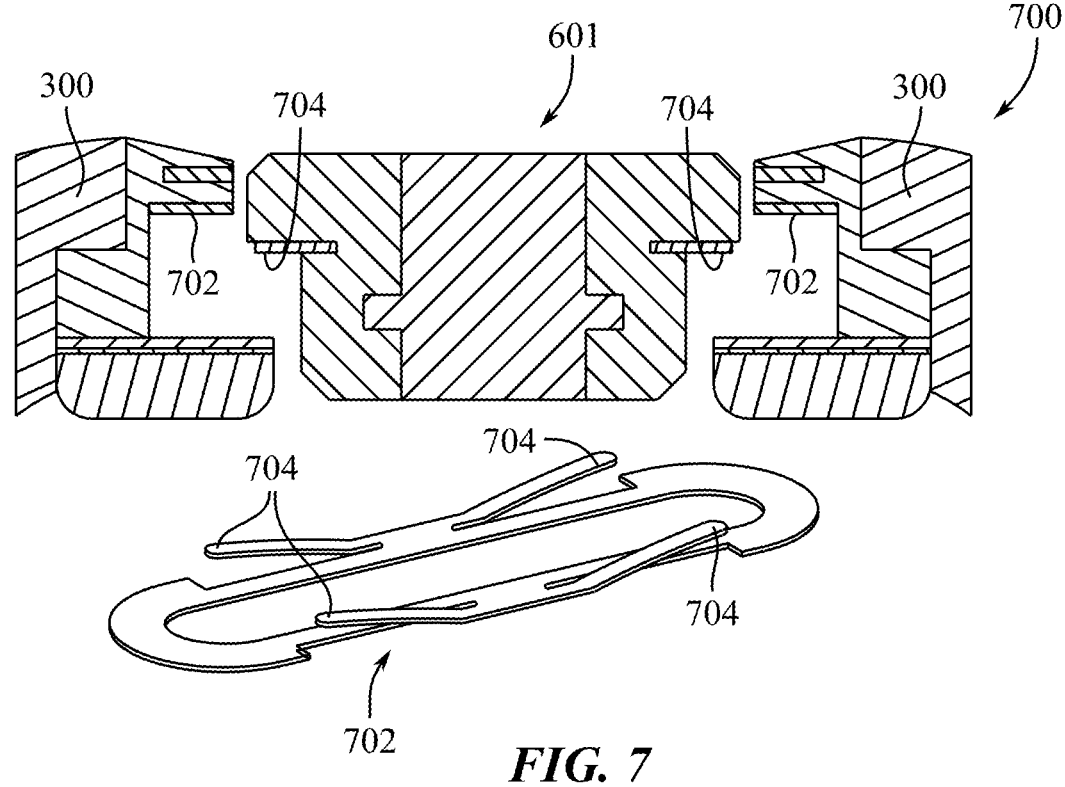
FIG. 7 illustrates a cross-sectional view of another example button and a perspective view of a biasing structure in accordance with one or more examples of the present disclosure.

As mentioned above, the one or more biasing structures 208 can include a variety of different types of biasing structures. In some examples, the one or more biasing structures 208 can include a spring biasing structure. In accordance with one or more such examples, FIG. 7 illustrates a cross-sectional view of a button 700 and a perspective view of a spring biasing structure 702. The button 700 can include one or more of the same or similar features discussed above.

As shown, the button 700 can include the button body 601 that is movable relative to the button mounting piece 300 (e.g., in response to a user input at the button body 601). In particular examples, the button body 601 is a floating button body that can be biased against a device button via a spring biasing structure 702 (which is depicted upside down in the perspective view).

As shown, the spring biasing structure 702 can include biased tabs 704 (e.g., a set of elastically bendable members or leaf spring arms). The biased tabs 704 can include bent or curved portions (like a leaf spring) that can extend out of plane relative to a main body of the spring biasing structure 702. The biased tabs 704 can include a predetermined spring rate (or spring constant) that coincides with a force-displacement curve for the spring biasing structure 702.

Like the foam biasing structure 602, the spring biasing structure 702 can also move in various ways to both apply a preload force to the button body 601 (e.g., to seat the button body 601 against a device button on an electronic device) and receive an applied force from a user input to the button body 601. To do so, the biased tabs 704 can apply a resting force or biasing force against the button body 601. Similarly, the biased tabs 704 can actuate in and out of plane relative to the spring biasing structure 702 in response to an applied force at the button body 601 (thereby dissipating the applied force and/or providing a tactile feedback response).

Any of the features, components, parts, including the arrangements and configurations thereof shown in FIG. 7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 7.

Figures 8A, 8B:
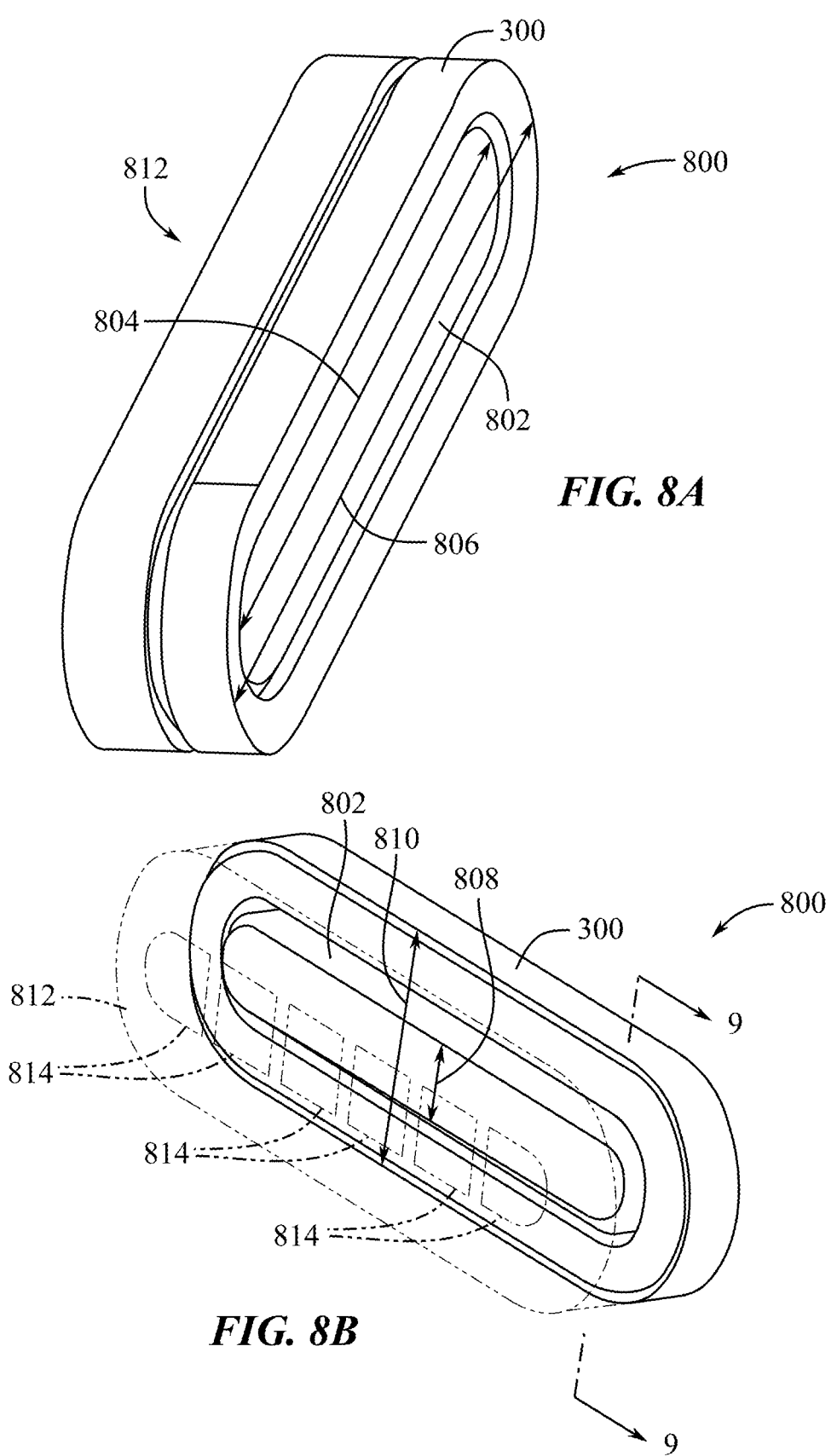
FIGS. 8A-8B illustrate an example button positioned adjacent to a touch sensor in accordance with one or more examples of the present disclosure.

FIGS. 8A-8B illustrate a button 800 positioned adjacent to a touch sensor 812 in accordance with one or more examples of the present disclosure. As shown, the button 800 can include a button insert 802. As used herein, the term button insert can refer to an in-lay, a drop-in element, an attachment, a core, a central portion, etc. for the button 800. In particular examples, a button insert can include a solid piece of material (e.g., a slab of material, a machined piece of material, a fitted material, a molded material, a single integral body, etc.).

The button insert 802 can include a variety of one or more materials. In some examples, the button insert 802 can include a ceramic material to form a ceramic case button (e.g., a button at least partially including a ceramic material). Some specific examples of a ceramic material for the button insert 802 can include zirconium dioxide, silicon nitride, boron nitride, stoneware, glass, barium titanate, silicate ceramics, advanced ceramics, silicon carbide, aluminum oxide, alumina, nitride ceramics, boron carbide, etc. In these or other examples, the button insert 802 can include a certain ratio of ceramic material, a certain segment or portion of ceramic material, or at least a portion with ceramic flecks, particles, or pieces. In at least one example, the button insert 802 can be composed entirely of a ceramic material (e.g., from top to bottom and side-to-side). In at least one example, the button insert 802 is a non-metallic button insert (e.g., entirely devoid of a metal material, or is composed of less than 10 percent by weight and/or volume of a metal material).

In some examples, the button insert 802 can include a composite material. A composite material can include at least two materials with differing material and/or chemical properties. In some examples, the composite material includes a polymer material and one or more other materials having a high dielectric constant (e.g., a non-metallic material having a dielectric constant greater than 10). For example, the polymer material can include a plastic material (e.g., for various strength, toughness, and/or durability properties) and a ceramic material for enhanced relative permittivity (also known as dielectric constant that quantifies a material's ability to hold an electric charge). Permittivity or dielectric constant of a material is defined as the ratio of permittivity of the material to the permittivity of a vacuum or free space. A dielectric constant can also be used as a measure of a material's polarization (or polarizability).

In at least one example, the button insert 802 can include a doped material (e.g., to increase the permittivity of the button, to improve the sintering process, to enhance toughness of the material, etc.). A doped material can include a material that includes one or more doping agents. Doping agents can include a variety of materials, including metals. Some particular examples of doping agents can include p-type acceptors (e.g., boron, aluminum, gallium, indium), n-type donors (e.g., phosphorus, arsenic, antimony, bismuth, lithium), germanium, silicon, nitrogen, gold, platinum, gallium-based combinations, cadmium-based combinations, etc. For button materials having a crystalline structure (such as a ceramic material), the doping agent can be added to the lattice structure of the button material, thereby altering the physical properties of the button insert 802. A variety of doping processes are also herein contemplated, including chemical doping, electrochemical doping, magnetic doping, modulation doping, etc.

In view of the foregoing, the button insert 802 can include a variety of material properties, particularly a desired dielectric constant (or range of dielectric constants). For example, the button insert 802 can include a dielectric constant greater than 20. In some examples, the button insert 802 includes a dielectric constant ranging between 200 and 5000, between 300 and 4000, or between 1000 and 3000 (e.g., for ceramic button inserts). As another example, the button insert 802 can include a range of dielectric constants ranging between 10 and 300, between 15 and 250, or between 20 and 200 (e.g., for a composite button insert and/or a button insert that includes a doped material).

Further shown, the button insert 802 can include an insert length 804 and an insert width 808. In some examples, the insert length 804 and the insert width 808 form an entirety of the button 800. In other examples, the button insert 802 forms a portion of the button 800. For example, and as depicted, the button insert 802 can be positioned inside of the button mounting piece 300, which is attached to or otherwise integrated with the case body 202. That is, the insert length 804 can be less than a button length 806, which includes a length or lateral thickness of the button mounting piece 300. Similarly, the insert width 808 can be less than a button width 810, which also includes a width or perpendicular lateral thickness of the button mounting piece 300.

In particular examples, the button insert 802 can include certain dimensions relative to the button 800. For instance, the insert length 804 can be between 40% and 99% of the button length 806, between 50% and 98% of the button length 806, between 60% and 97% of the button length 806, between 65% and 96% of the button length 806, between 70% and 95% of the button length 806, between 75% and 90% of the button length 806, or between 80% and 85% of the button length 806. In some examples, the insert width 808 is between 30% and 95% of the button width 810, between 35% and 90% of the button width 810, between 45% and 85% of the button width 810, between 50% and 80% of the button width 810, between 55% and 75% of the button width 810, between 60% and 70% of the button width 810, or about 65% of the button width 810.

In these or other examples, one or more of the foregoing dimensional ratios of the button insert 802 relative to the button 800 can be implemented to provide an optimal or maximum signal (e.g., a capacitance signal) between an outer surface of the button 800 and the touch sensor 812 of an electronic device, as will be discussed more below in relation to FIG. 9. Indeed, as discussed below, the dimensions of the button insert 802 relative to the button 800 can define a lateral dimensional gap between the perimeter of the button insert 802 and an electric ground disposed on the electronic device. That gap can affect signal loss (e.g., signal detection losses or signal attenuation) for the touch sensor 812 of an electronic device.

The touch sensor 812 can include a variety of one or more sensors (e.g., a switch sensor, a force sensor, a capacitance sensor, etc. as described more below in relation to FIG. 13). In particular examples, the touch sensor 812 can include one or more sensor pixels 814 disposed on or within the touch sensor 812. The sensor pixels 814 can include electrodes, measurement areas, sensing regions, capacitive plates, electrical contacts, circuitry, transducers, force-dependent resistors, signal receptors, receivers, etc. In these or other examples, each sensor pixel of the sensor pixels 814 can be overlapped by the button insert 802 (e.g., such that each sensor pixel of the sensor pixels 814 are capacitively coupled to the button insert 802).

Any of the features, components, parts, including the arrangements and configurations thereof shown in FIGS. 8A-8B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 8A-8B.

Figure 9:
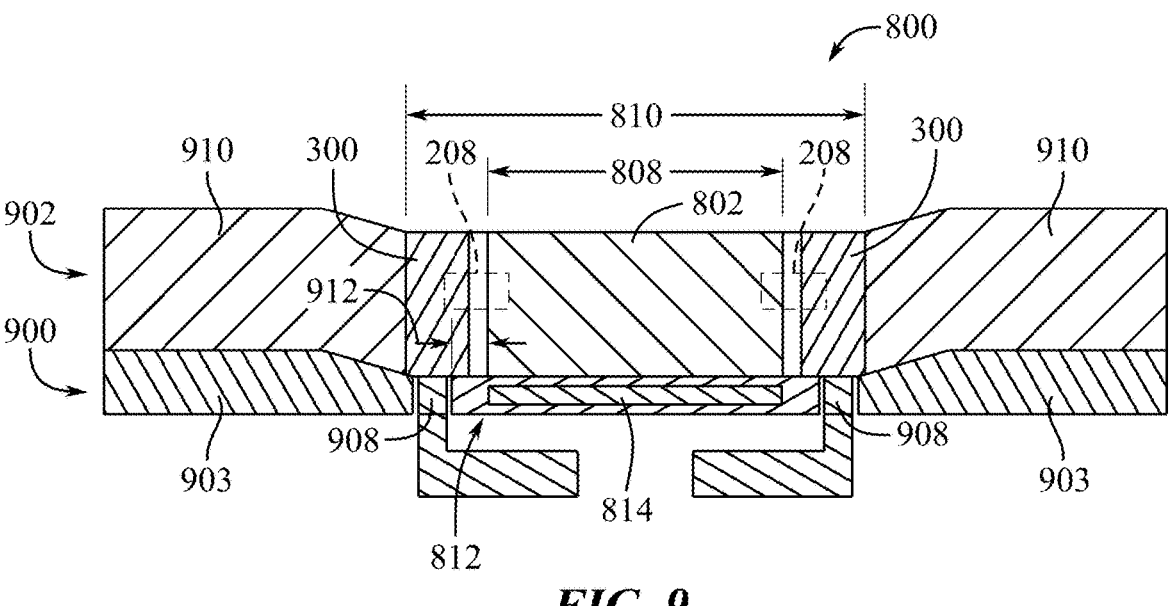
FIG. 9 illustrates a cross-section of an example case disposed around an example electronic device in accordance with one or more examples of the present disclosure.

FIG. 9 illustrates a cross-section of an example case 902 disposed around an example electronic device 900 in accordance with one or more examples of the present disclosure. The case 902 can include the button 800 (which includes the button insert 802 discussed above) biased against the device button via the one or more biasing structures 208. In these or other examples, the button insert 802 (or the button body of the button 800) can abut a device button—including the touch sensor 812—of the electronic device 900.

As shown, the electronic device 900 can include a chassis 903 and the touch sensor 812 disposed within the chassis 903. The chassis 903 can include the frame, body, or housing of the electronic device 900 (which is the same as or similar to the electronic device 106 discussed above).

Further shown, the electronic device 900 can include an electric ground 908 positioned adjacent to the touch sensor 812. The electric ground 908 can include any element having a connection to an electrical ground (e.g., a common return path for electrical current for the electronic device 900, a reference point from which voltages are measured for the electronic device 900, a zero-voltage location, etc.). In some examples, the electric ground 908 can include a trim piece, a frame connection piece, a bracket, a mount, etc. As will now be described below, the electric ground 908 can influence (e.g., decrease or "ground out") the electric charge of elements adjacent to the electric ground 908.

The button 800 can be configured to charge couple a user finger and the device button, e.g., the touch sensor 812 of the device button. Charge coupling a user finger and the touch sensor 812 can include allowing localized electric charge flux through the button 800 to the touch sensor 812. Charge coupling a user finger and the touch sensor 812, in particular, can cause localized changes in electrical charge or capacitance within the button insert 802 to be detected at the touch sensor 812. Upon being charge coupled, the touch sensor 812 can therefore detect which region(s) of the button insert 802 positionally correlate—relative to the sensor pixels

814—with a user input from a user finger on the outer surface of the button insert 802. In this manner, the touch sensor 812 can positionally identify a user input (e.g., the user input discussed above in relation to FIGS. 12B-12C) at the button insert 802 relative to one or more sensor pixels 814. User inputs are further discussed below in relation to FIG. 13.

To enable the foregoing functionality, the button insert 802 can be precisely sized and positioned within the button 800 such that, when the button 800 is positioned against the touch sensor 812, the electric ground 908 has little or no impact on the button insert 802 (e.g., by grounding out an electric charge stored or induced within the button insert 802). To illustrate, the button insert 802 can define a lateral perimeter gap 912 between the button insert 802 and the electric ground 908. Specifically, the button insert 802 can be positioned over the touch sensor 812 and spaced laterally inward to define the gap 912 between the button insert 802 and the electric ground 908. In some examples, the gap 912 is defined by the size of the button insert 802 relative to the button 800, which relative sizing is discussed above in relation to FIG. 8. Based on the relative sizing of the button insert 802 relative to the button 800, the gap 912 can, for example, be larger along a width of the button insert 802 than along a length of the button insert 802. In this manner, the gap 912 can help ensure that changes in electrical charge within the button insert 802 are detectable by the touch sensor 812, rather than the electric ground 908 grounding out electrical charges and inhibiting a sensor reading via one or more of the sensor pixels 814. The gap 912 can also provide for larger manufacturing tolerances (e.g., of the button insert 802, biasing structures 208, or the sensor pixels 814).

In some examples, the mechanical structure of the button 800 can also reduce a charge coupling between the button insert 802 and the electric ground 908 through the case 902. For example, the button insert 802 can be a floating button insert such that there is an open space between the button insert 802 and the button mounting piece 300. As another example, the one or more biasing structures 208 coupling the button insert 802 to the button mounting piece 300 (and therefore the body portion of the case 902) can including biasing structures that are substantially insulative/not electrically conductive. For instance, the biasing structures 208 can include an elastomer seal that does not transfer electric charge between the button insert 802 and the button mounting piece 300 (and therefore the body portion of the case 902 and into the electric ground 908).

The case 902 can also be designed to mitigate signal loss between the button insert 802 and the touch sensor 812. That is, the case 902 can be designed to reduce charge coupling (e.g., charge dissipation) between the button insert 802 and the electric ground 908 through the case 902. For example, the case 902 can include a material with a dielectric constant lower than 8. In particular examples, the case 902 can include a material with a dielectric constant ranging between 1 and 6, between 1 and 4, between 2 and 5, or between 3 and 4. In this manner, the button insert 802 can be substantially charge-insulated from the case 902 (such as the body portion or frame of the case 902). The button insert 802 can be substantially charge insulated from the case 902 when the dielectric constant of the case 902 is about 1 to 4 orders of magnitude less than the dielectric constant of the button insert 802. Additionally or alternatively, the button insert 802 can be substantially charge-insulated from the case 902 when a percentage signal loss (relative to a full-scale capacitance signal when a user finger touches the touch sensor 812 directly) due to the case 902 surrounding the button insert 802 is less than 50% signal loss, less than 40% signal loss, less than 30% signal loss, less than 15% signal loss, or less than 5% signal loss.

It will be appreciated that when the case 902 is disposed around the electronic device 900, the case 902 (including the button 800) can attenuate a capacitance signal detected at the touch sensor 812. Unlike conventional cases, however, the magnitude of signal attenuation is comparatively lower by a significant amount. For example, according to the following expression:

$$\text{Total Signal} = C_1\left(\frac{C_2}{((C_1 + C_2))}\right)$$

the term "Total Signal" represents how much capacitance signal the one or more sensor pixels 814 can detect at the touch sensor 812 when the case 902 is disposed around the electronic device 900, the term "$C_1$" represents a full-scale signal capacitance signal detected by the one or more sensor pixels 814 when a user finger touches the touch sensor 812 directly (e.g., without the case 902), the term "$C_2$" represents a capacitance contribution from the case 902 (including the button 800), and the term $$\text{``}\left(\frac{C_2}{((C_1 + C_2))}\right)\text{''}$$

represents a signal attenuation factor from the case 902. The lower the signal attenuation factor is, the greater the amount of signal attenuation there is. Conversely, when the signal attenuation factor is higher, the one or more sensor pixels 814 can detect a greater percentage of the full-scale capacitance signal represented by the term "$C_1$." In some examples, the signal attenuation factor for the case 902 (including the button 800) is greater than 0.6. By contrast, the signal attenuation factor for conventional cases can be less than 0.2, less than 0.1, less than 0.05, or even approach zero.

Any of the features, components, parts, including the arrangements and configurations thereof shown in FIG. 9 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 9.

Figure 10:
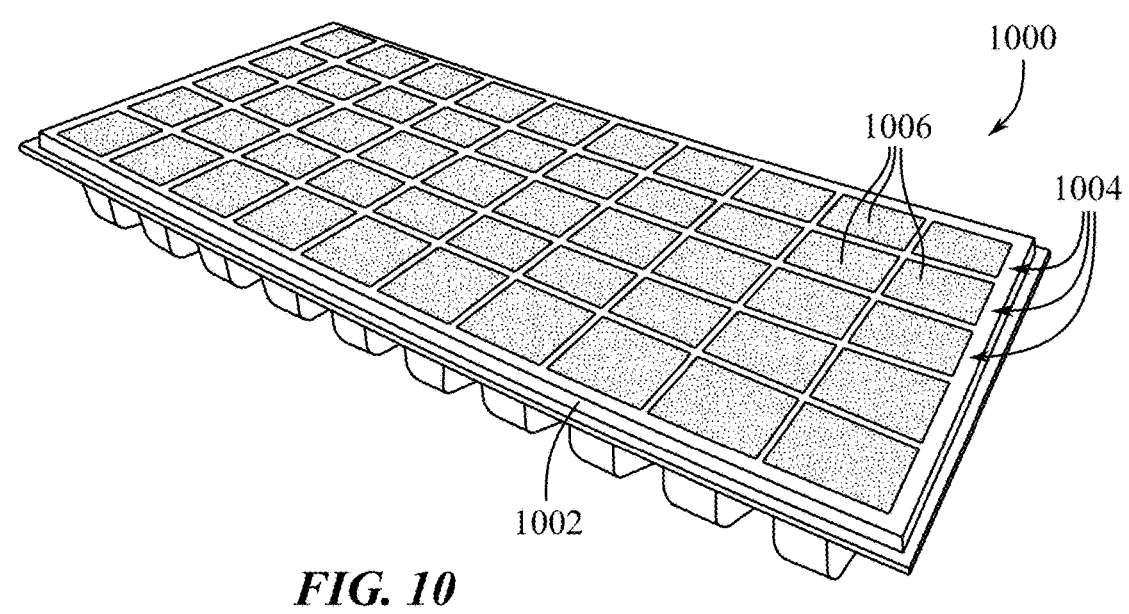
FIG. 10 illustrates an example button having a matrix configuration in accordance with one or more examples of the present disclosure.

As mentioned above, a high dielectric button insert (such as a ceramic button insert) of the present disclosure can include a variety of multiple materials. In accordance with one or more such examples, FIG. 10 illustrates an example button 1000. As shown, the button 1000 can include a matrix 1002 defining pockets 1004. In some examples, the matrix 1002 can include a composite material (e.g., a combination of polymers, a polymer material and a doping agent, etc.). In other examples, the matrix 1002 can include material used for printed circuit boards or substrates. In these or other examples, the pockets 1004 can be sized and shaped in a variety of matrix configurations, including rows and/or columns of a myriad of different pocket arrangements. In some examples, the pockets 1004 can be separated by the interstitial webbing or framework of the matrix 1002. In certain implementations, the interstitial webbing of the matrix 1002 is electrically insulative, thereby electrically isolating the individual pockets 1004. In particular examples, the pockets 1004 can be sized and shaped to receive a plurality of ceramic inserts 1006.

The ceramic inserts 1006 can include ceramic portions, chunks, pods, cubes, slabs, strips, bands, etc. of a ceramic material. The ceramic inserts 1006 can be formed in a variety of ways (e.g., milling, casting, molding, shaped, wheel-thrown, etc.). In some examples, the ceramic inserts 1006 can include modifications from various processing steps (e.g., from glazing, firing, etc.). The ceramic inserts 1006 can be exposed at their top and bottom surfaces while being held in place by the material forming the pockets 1004, thereby allowing charge coupling through the inserts 1006 with minimal interference from the matrix 1002.

In some examples, the button 1000 can be implemented to impart a variety of desired material properties. For example, the button 1000 can include the high-dielectric qualities of a ceramic button insert discussed above in relation to FIGS. 8-9 (e.g., due to the ceramic inserts 1006). In addition, the button 1000 can include various strength, toughness, and/or durability properties (e.g., due to the matrix 1002).

It will be appreciated that the button 1000 (including the pockets 1004 and the ceramic inserts 1006 disposed therein) can be adapted to align with the touch sensor 812—including individual sensor pixels of the sensor pixels 814 discussed above in relation to FIGS. 8-9. Additionally or alternatively, one or more surfaces of the button 1000 can be concealed, coated, or otherwise adapted to be visually perceived by a user as a single-material button.

Any of the features, components, parts, including the arrangements and configurations thereof shown in FIG. 10 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 10.

Figure 11A:
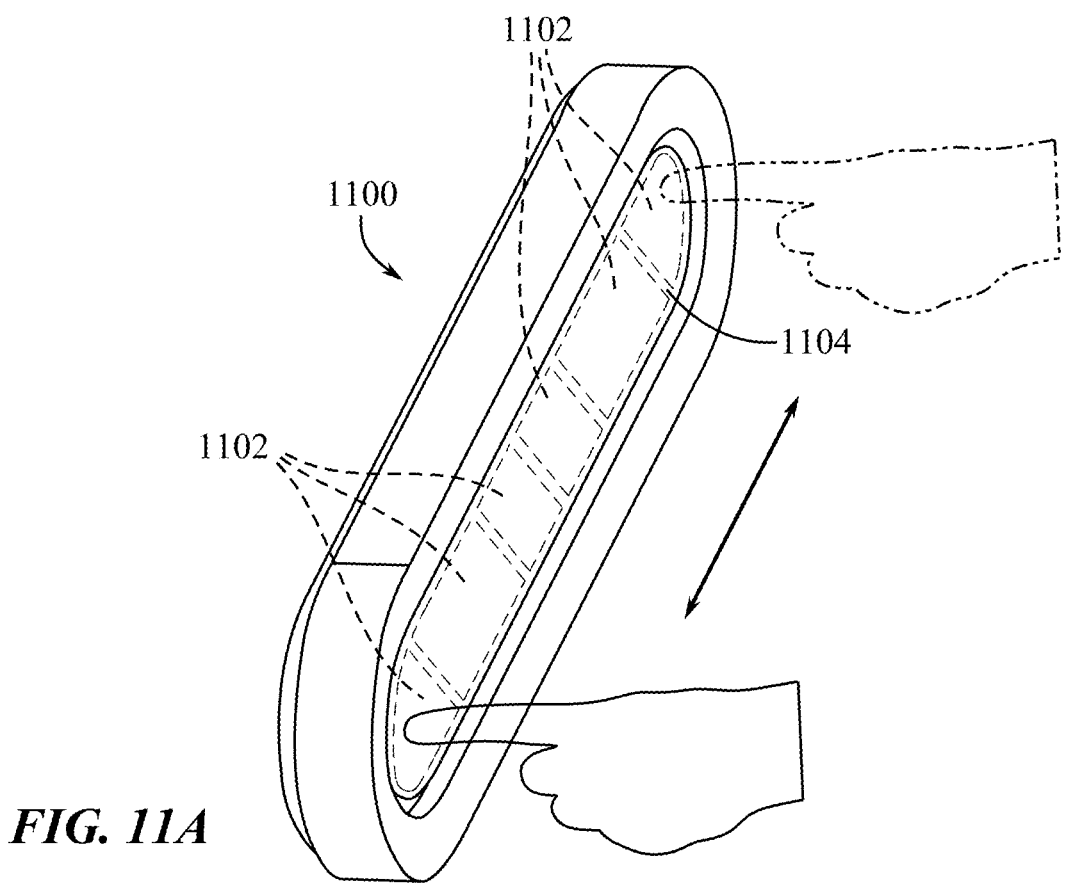
FIGS. 11A-11B illustrate an example user input to an example case button in accordance with one or more examples of the present disclosure.
Figure 11B:
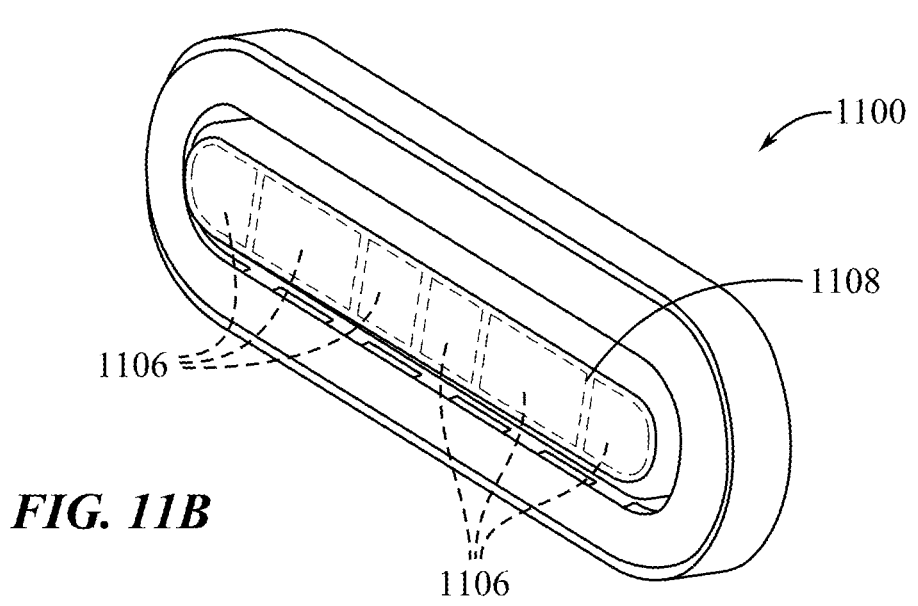

FIGS. 11A-11B illustrate an example user input to an example button 1100 in accordance with one or more examples of the present disclosure. The button 1100 can include the same or similar features to any button disclosed herein.

User inputs can include many different types of user inputs that are sensed via sensors of an electronic device (as will be discussed more below in relation to FIG. 13). These inputs, however, can be sensed through the button 1100 of a case. For example, a user input can include a press input (e.g., a first type of press or force input for actuating a collapsible switch in an electronic device), a partial press input (e.g., a second type of press or force input for activating a force sensor in an electronic device, wherein the second type differs from the first type of press or force input by the force being applied being lower in magnitude or not moving/collapsing a switch in the electronic device), or a touch input (e.g., a scroll, swipe, tap, or finger rest sensed via a capacitance sensor of an electronic device). As shown in FIGS. 11A-11B, the input can include a touch input in the form of a gesture or animated motion relative to the button 1100, such as a swipe from left-to-right (or optionally right-to-left) across a surface 1104 of the button 1100.

When the finger touches the surface 1104, a transfer of electric charge can occur and/or an electric field emitted or absorbed by the appendage can be sensed by a sensor beneath the surface 1104 on the device button. Similarly, as the finger swipe proceeds across the surface 1104, an additional transfer of electric charge or movement of the electric field can be detected. The transfer(s) of electric charge or movement(s) of the electric field occur between input regions 1102 disposed on the surface 1104 and receptor regions 1106 disposed on a surface 1108 opposite the surface 1104. Alternatively, and as described above in relation to FIG. 3C, for example, the input regions 1102 and/or the receptor regions 1106 can reside below exterior surfaces or underneath one or more layers of the button body. The input regions 1102 and receptor regions 1106 can respectively be examples of the first set of regions 308 and the second set of regions 310 discussed above.

As also discussed above, respective regions of the input regions 1102 and the receptor regions 1106 can be charge coupled. For example, in response to the user input, a transfer of electric charge can occur substantially between an input region and a receptor region. That is, electric charge transfer can occur mostly (if not entirely) between one pair of input region and corresponding receptor region, but not another pair of input region and corresponding receptor region. Alternatively, a substantially large transfer (e.g., a large quantity or a large magnitude) of electric charge or concentration of electric field strength can occur between one pair of corresponding input and receptor regions, and a comparatively weak transfer (e.g., a small quantity or a small magnitude) of electric charge or concentration of electric field strength can occur between another pair of input-receptor regions. The terms "substantial" or "substantially" in reference to charge transfer or charge coupling can, in some examples, be interpreted as at least a majority (i.e., greater than 50%). The terms "substantial" or "substantially" in the same or similar context can also be referred to as the most or the greatest amount (e.g., of electric charge transfer) relative to other amounts. A discussion of electric charge transfer, particularly orientations of an electric field in response to a user input at the button, follows below in relation to FIGS. 12A-12C.

Any of the features, components, parts, including the arrangements and configurations thereof shown in FIGS. 11A-11B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 11A-11B.

Figure 12A:
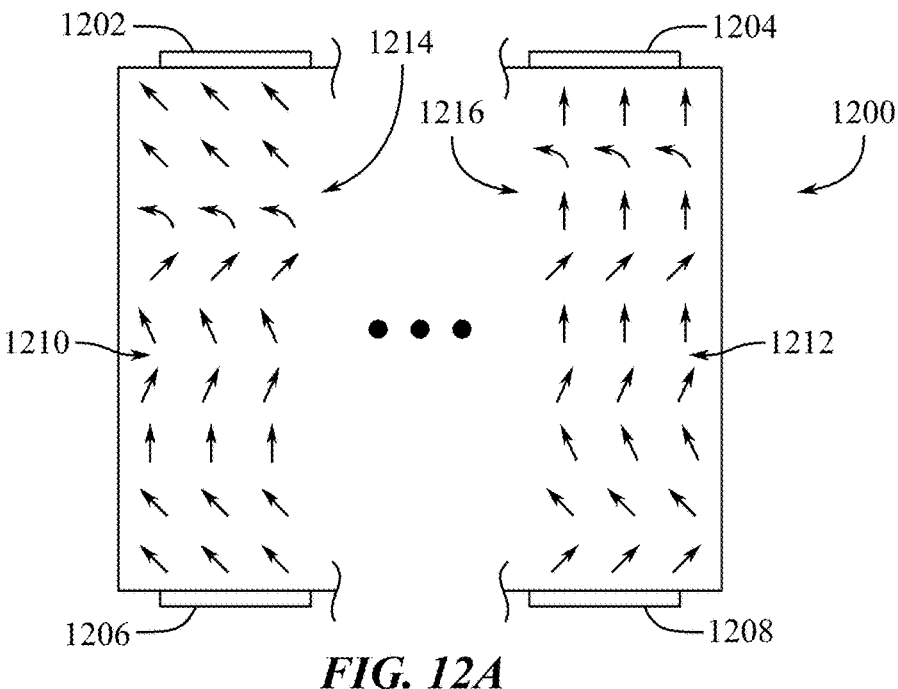

FIGS. 12A-12C illustrate example electric field orientations as shown in a side cross-section through a button 1200 in response to a user input applied at the surface of the button 1200 in accordance with one or more examples of the present disclosure. The button 1200 can include the same or similar features of any button disclosed herein. In particular examples, the button 1200 can include a button insert (e.g., as described above in relation to FIGS. 8A-8B). In these or other examples, the button 1200 (as illustrated) does not include conductors through which the transfer of electric charge occurs. Rather, electric charge transfer can occur throughout the button body. Additionally, and for purposes of illustration and clarity of discussion, input regions and receptor regions are depicted as being raised or elevated from the button body. However, these regions should not be interpreted as necessarily having such structure and can be alternatively defined as regions or areas on the surface of the button insert.

As shown in FIG. 12A, there is no user input applied to the button 1200. Between an input region 1202 and a receptor region 1206, a first portion 1210 of an electric field is shown as including an example orientation 1214. The term orientation in the context of an electric field refers to a direction of electric field lines representing the electric field. Electric field lines typically point away from a positive charge and toward a negative point (or charge). Likewise, between an input region 1204 and a receptor region 1208, a second portion 1212 of an electric field is shown as including an example orientation 1216. In the state of FIG. 12A, wherein input is not being applied to the button 1200, the orientations 1214, 1216 of each electric field are substantially randomized and unaffected by any electric fields external to the button 1200. Sensors at the receptor regions 1206, 1208 therefore would not detect a difference between the fields 1210, 1212 or what is happening at the input regions 1202, 1204.

In FIG. 12B, a user finger 1218 (or other appendage, electrostatic instrument, or stylus) is brought into contact with the input region 1202 (e.g., for applying a touch input such as the one shown in FIG. 11A). As shown, a transfer of electric charge occurs at least within the first portion 1210 of the electric field. Specifically, the first portion 1210 of the electric field changes from the orientation 1214 (shown in FIG. 12A) to an orientation 1220. In this example, the orientation 1220 can include electric field lines all (or substantially all) directionally aligned relative to one another. At the same time, the second portion 1212 of the electric field can include an orientation 1222. In some examples, and as shown in FIG. 12B, the orientation 1222 can be the same as or similar to the orientation 1216 (shown in FIG. 12A when no user input is applied to the button 1200). In other examples, the orientation 1222 can be different from the orientation 1216 (e.g., including a blended orientation between the orientation 1216 and the orientation 1220). A blended orientation can include a hybrid orientation that reflects part of a first orientation with no user input and a second orientation responsive to a user input. Thus, application of the user finger 1218 and its transfer of electric charge can reorient and direct an electric field through a first portion of the button 1200 (with portion 1210 of the field) while leaving a second portion of the button 1200 (with portion 1212) substantially unaffected or significantly less affected relative to the first portion. Accordingly, a sensor at receptor region 1206 (e.g., a sensor pixel 814 of the touch sensor 812 discussed above) would detect a different electrical charge or electric field as compared to receptor region 1208. This difference in charge or electric field would allow the sensor to detect that something is applying or absorbing a charge or electric field at input region 1202 differently than anything at input region 1204.

In FIG. 12C, the user finger 1218 has moved from the input region 1202 and is brought into contact with the input region 1204 (e.g., in completing a swipe or scroll touch gesture input). In so doing, a transfer of electric charge occurs at least within the second portion 1212 of the electric field. Specifically, the second portion 1212 of the electric field changes from the orientation 1222 (shown in FIG. 12B) to an orientation 1226. In this example, the orientation 1226 can include electric field lines all (or substantially all) directionally aligned relative to one another. At the same time, the first portion 1210 of the electric field can include an orientation 1224. In some examples, and as shown in FIG. 12C, the orientation 1224 can be the same as or similar to the orientation 1214 (shown in FIG. 12A when no user input is applied to the button 1200). In other examples, the orientation 1224 can be different from the orientation 1214 (e.g., including a blended orientation between the orientation 1214 and the orientation 1226). Thus, a sensor at the receptor regions 1206, 1208 (e.g., a sensor pixel 814 of the touch sensor 812 discussed above) would detect something is applying or absorbing a charge or electric field at input region 1204 differently than anything at input region 1202. That is, a touch sensor at or adjacent to the receptor regions 1206, 1208 can positionally identify a user input. Specifically, by comparing the sensor signals of the state of FIG. 12B and the sensor signals of the state of FIG. 12C, a computing device can determine whether the user finger 1218 is positioned at one input region or another, even though the sensor is separated from the input regions 1202, 1204 by the button body.

Any of the features, components, parts, including the arrangements and configurations thereof shown in FIGS. 12A-12C can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 12A-12C.

Figure 13:
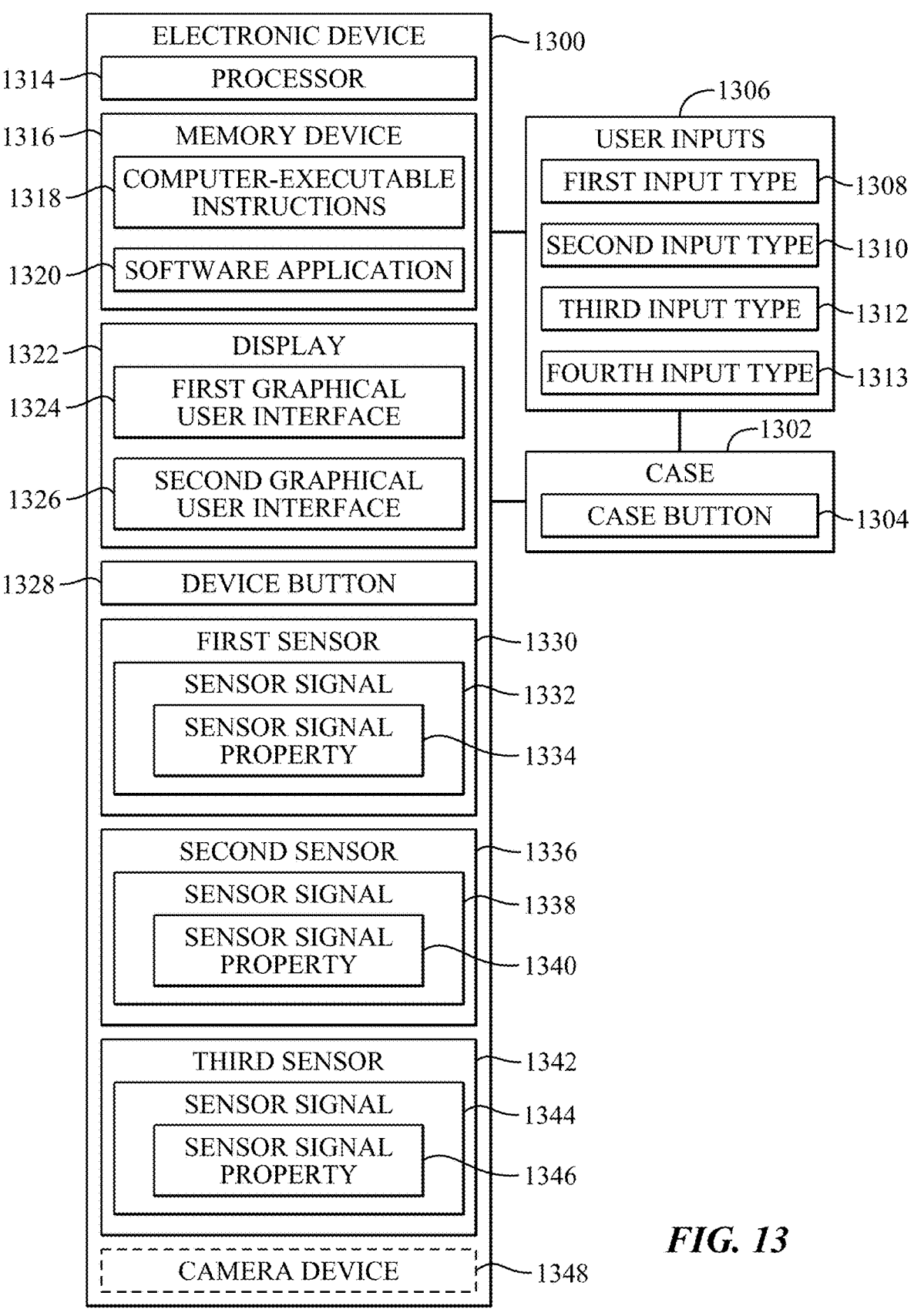
FIG. 13 illustrates a schematic diagram of an example electronic device, a case, and user inputs in accordance with one or more examples of the present disclosure.

FIG. 13 illustrates a schematic diagram of an example electronic device 1300, a case 1302, and user inputs 1306 in accordance with one or more examples of the present disclosure. The electronic device 1300 can be the same as or similar to the electronic device 106 discussed above. Similarly, the case 1302 can be the same as or similar to the case 102 discussed above.

As shown, the electronic device 1300 can include a processor 1314, a memory device 1316, a display 1322, a device button 1328, a first sensor 1330 (e.g., a collapsible switch), a second sensor 1336 (e.g., a force sensor), a third sensor 1342 (e.g., a capacitance sensor), and an optional camera device 1348. Each is discussed in turn and in relation to the user inputs 1306 and the case 1302. Specifically, the following discussion explains various functionalities of the different components of the electronic device 1300 when one or more of the user inputs 1306 is applied to a case button 1304 of the case 1302, and when the user input is effectively transferred to a device button 1328.

Accordingly, the device button 1328 can be coupled to each of the first sensor 1330, the second sensor 1336, and the third sensor 1342. That is, the one or more of the first sensor 1330, the second sensor 1336, or the third sensor 1342 can be disposed on, adjacent to, or within the device button 1328. Additionally or alternatively, one or more of the first sensor 1330, the second sensor 1336, or the third sensor 1342 can be attached, connected to, or linked with the device button 1328. In some examples, the connection between the device button 1328 and the first sensor 1330, the second sensor 1336, or the third sensor 1342 includes an electrical pathway or wired connection (e.g., a USB connection, UART connection, USART connection, I2C connection, SPI connection, QSPI connection, etc.). In certain examples, the connection between the device button 1328 and the first sensor 1330, the second sensor 1336, or the third sensor 1342 is mechanical-based (e.g., a physical linkage, switch, or connector). Still, in other examples, the connection between the device button 1328 and the first sensor 1330, the second sensor 1336, or the third sensor 1342 is a wireless connection (e.g., for wireless communication such as a wireless local area network communication, wireless area network communication, wireless personal area network communication, wide area network communication, etc.). Some particular examples of wireless communication include a Wi-Fi based communication, mesh network communication, BLUETOOTH® communication, near-field communication, low-energy communication, Zigbee communication, Z-wave communication, and 6LoWPAN communication. In some examples, the device button 1328 can also be similarly coupled to the camera device 1348 (as will be discussed below).

Thus, when the device button 1328 is engaged in response to the user inputs 1306 via the case button 1304, at least one of the first sensor 1330, the second sensor 1336, or the third sensor 1342 can generate a corresponding sensor signal that can initiate a wide range of functions for the electronic device 1300. The term "signal" in relation to a sensor or device component can include an electrical signal, analog signal, digital signal, or executable piece of computer code. It will be appreciated that the electronic device 1300 can perform these functions without the case 1302. However, as disclosed herein, various functionalities and user input interactions can be permitted with the case 1302 disposed around the electronic device 1300.

In particular examples, the electronic device 1300 can use its sensors to identify specific user inputs or types of user inputs. For example, the electronic device 1300 can identify a first input type 1308 using the first sensor 1330, a second input type 1310 using the second sensor 1336, and a third input type 1312 using the third sensor 1342. The case button 1304 having one of the button bodies disclosed herein can permit the user inputs 1306—including each of the first input type 1308, the second input type 1310, and the third input type 1312—to be transferred to the device button 1328 through the button body of the case button 1304.

In more detail, the first sensor 1330 can include a collapsible or movable switch (e.g., a tactile switch, keyswitch, DIP switch, snap-action switch, detect switch, pushbutton switch, rocker switch, toggle switch, navigation switch, slide switch, rotary switch, switchlock, collapsible dome, etc.) configured to identify the first input type 1308. In these or other examples, the first input type 1308 can include a press input correlating to depression of the case button 1304 relative to the case 1302 that causes the collapsible switch to collapse or otherwise move to an actuated position or corresponding to exceeding a threshold amount of button displacement. Accordingly, the case button 1304 is operable to transfer a force to actuate the collapsible switch—causing the collapsible switch to generate a sensor signal 1332 (e.g., an actuation signal).

The second sensor 1336 can include a force sensor (e.g., a strain gauge, load cell, force sensing resistors, piezoelectric force sensors, optical force sensor, capacitive force sensor, etc.) configured to identify the second input type 1310. The second input type 1310 can include a partial press input correlating to an applied force that partially depresses the button body of the case button 1304 relative to the case 1302 to activate (e.g., trigger, wake, induce a sample or measurement of) the force sensor. In some examples, the force sensor can measure an input force applied to the device button 1328 (e.g., from the case button 1304). In these or other examples, the case button 1304 is operable to transfer a force to cause the force sensor to generate a sensor signal 1338 (e.g., a force signal).

In particular examples, the applied force includes a magnitude insufficient to actuate the first sensor 1330. For example, the force sensor (e.g., the second sensor 1336) can detect a partial press input or other input less than the threshold amount of button displacement needed for the first sensor 1330 to actuate, so the collapsible switch (e.g., the first sensor 1330) may not detect the partial press input due to the magnitude of the applied force being less than an actuation force to actuate the collapsible switch.

The third sensor 1342 can include a capacitance sensor (e.g., a capacitive sensor, touch sensor, inductive sensor, proximity sensor, etc.) configured to identify the third input type 1312. The third input type 1312 can include at least one of a scroll (e.g., side-to-side finger motions), a swipe (e.g., a continuous sweep across a button surface), a tap (e.g., a light touch-and-release motion that does not necessarily depress the case button 1304), or a finger rest (e.g., placement or motionless positioning of the finger on the case button 1304). In some examples, the capacitance sensor can detect changes in an electrical field permitted to pass through the case button 1304. The changes in the electrical field can, as described in relation to FIGS. 12A-12C for instance, correlate with user inputs-such as the dynamic motion of a user finger along an outer surface of the case button 1304.

In these or other examples, the case button 1304 is operable to transfer electric charge through the case button 1304 and to the device button 1328 so that the capacitance sensor can generate a sensor signal 1344 (e.g., a capacitance signal). In particular examples, the capacitance sensor is enabled to detect a position of a touch input applied to the case button 1304 relative to an outer surface of the case button 1304 (as discussed in relation to previous figures). For example, the capacitance sensor can detect a user input applied to a first input region versus a second input region on the surface of the case button 1304.

In certain implementations, the third sensor 1342 can include a capacitance sensor configured to identify a fourth input type 1313. The fourth input type 1313 can include a hover input correlating to a user finger positioned within a threshold proximity away from the button body of the case button 1304. That is, a hover input can include a finger, palm, wrist (or other appendage portion) positioned adjacent to the case button 1304, but not in contact with the case button 1304. A hover input can include motionless hovers (e.g., directly above the case button 1304) or moving hovers (e.g., finger swipes in the air above the case button 1304, hand passes in the air above the case button 1304, etc.). In some examples, a hover input can be followed by at least one of the first input type 1308, the second input type 1310, or the third input type 1312. In these or other examples, the processor 1314 can register a hover input as indicative of a soon-to-follow additional user input. Further, in some examples, the processor 1314 can, in anticipation of an additional user input, transmit a signal to one or more components. For example, the processor 1314 can transmit a signal to the display 1322 to alter a user interface (e.g., change the displayed first graphical user interface 1324 to the second graphical user interface 1326) when the processor 1314 anticipates an additional user input following a hover input. Accordingly, in some examples, a hover input can provide an expectation or anticipation of an additional user input.

The various input types identified can be used to perform a variety of different functions of the electronic device 1300. To illustrate a few examples, the third input type 1312 can be used to navigate (e.g., scroll, pause, pan, go to the next page, chapter, or song, etc.) in the graphical user interfaces 1324, 1326. As another example, the first input type 1308 can be used to interact with (e.g., zoom, select, confirm selection, move, rotate, translate, delete, etc.) a user interface element (e.g., a graphical representation) of the graphical user interfaces 1324, 1326.

In yet another example, the electronic device 1300 can include a camera device 1348 in some implementations. A camera device can include a photo sensor, image sensor, etc. In these or other examples, the second input type 1310 can cause the camera device 1348 to focus, and the first input type 1308 can cause the camera device 1348 to capture image content (e.g., a digital pictorial representation of an object or environment disposed in the field of view or viewfinder of the camera device 1348).

In some examples, the processor 1314 can include a system on chip, integrated circuit, driver, microcontroller, application processor, crossover processor, etc.). The memory device 1316 can include individual nonvolatile memory, processor-embedded nonvolatile memory, random access memory, memory integrated circuits, DRAM chips, stacked memory modules, storage devices, memory partitions, etc.

In particular examples, the memory device 1316 can include computer-executable instructions 1318. The following are some example implementations of the computer-executable instructions 1318. In one example, the computer-executable instructions 1318 include instructions that, when executed by the processor 1314, cause the processor 1314 to identify a user input based on one of the sensor signals 1332, 1338, or 1344 (e.g., an actuation signal from the first sensor 1330, a force signal from the second sensor 1336, or a capacitance signal from the third sensor 1342). The user input can include at least one of the first input type 1308 (e.g., a press input that causes the collapsible switch to collapse), the second input type 1310 (e.g., a partial press input that activates the force sensor but does not cause the collapsible switch to collapse), or the third input type 1312 (e.g., a touch input type that includes at least one of a scroll, a swipe, a tap, or a finger rest).

Based on the user input identified, the processor 1314 can generate a display signal causing the display 1322 to generate a first graphical user interface 1324. A graphical user interface can include one or more graphical representations (e.g., images, text, animations, emojis, notifications, banners, icons, etc.) accessible for viewing and/or user interaction at the display 1322. A graphical user interface can specifically include a touchscreen graphical user interface, menu-driven interface, command line interface, form-based interface, natural language interface, etc.

In another example, the memory device 1316 includes computer-executable instructions 1318 that, when executed by the processor 1314, cause the processor 1314 to identify a second user input based on another one of the sensor signals 1332, 1338, or 1344. Based on the second user input identified (whether the first input type 1308, the second input type 1310, or the third input type 1312), the processor 1314 can generate a second display signal causing the display 1322 to generate a second graphical user interface 1326. In one or more examples, the second graphical user interface 1326 at least partially differs from the first graphical user interface 1324 (e.g., by including one or more additional graphical representations and/or by omitting one or more previously display graphical representations).

The memory device 1316 can include a software application 1320. The software application 1320 can include a software program designed to execute one or more tasks (e.g., a programmed set of instructions). The software application 1320 can include programming language, code bases, call functions, application programming interfaces, etc. Examples of a software application can include freeware, shareware, open-source, closed source, word processing software, spreadsheet software, presentation software, multimedia software, web browsers, educational software, graphics software, and simulation software. More colloquially, software applications can include games, utilities, social media applications, news applications, weather applications, camera applications, etc.

In these or other examples, the memory device 1316 can include computer-executable instructions 1318 that, when executed by the processor 1314, cause the processor 1314 to identify a user input based on at least one of the sensor signal 1332, the sensor signal 1338, or the sensor signal 1344 (e.g., an actuation signal, a force signal, or a capacitance signal). Based on the user input identified, the processor 1314 can generate a signal causing the memory device 1316 to run the software application 1320. For example, the processor 1314 can open a web browser, activate a camera application, begin playing a song from a music player application, etc.

In some examples, and as described above, the case button 1304 can apply a resting force (e.g., a biasing force) against the device button 1328 when the case button 1304 is disposed around the device button 1328. The resting force can ensure the case button 1304 maintains contact with the device button 1328 when the case 1302 is disposed around the electronic device 1300. In certain implementations, the resting force can include a magnitude ranging between 8 grams-force and 30 grams-force. This particular magnitude range of resting force can ensure the desired persistent contact between the case button 1304 and the device button 1328, but in a way that does not overly load the device button 1328 (e.g., by partially actuating the device button 1328 and contributing to a poor tactile feel).

In these or other examples, the memory device 1316 can include computer-executable instructions 1318 that, when executed by the processor 1314, cause the processor 1314 to transmit a signal to one or more components of the electronic device 1300 when the second sensor 1336 (e.g., the force sensor) detects the resting force for a time period (e.g., between 1 second and 30 seconds, between 2 seconds and 10 seconds, or between 5 seconds and 8 seconds). For example, the processor 1314 can transmit the signal to the second sensor 1336 (e.g., the force sensor) to cause the second sensor 1336 to calibrate for the resting force. In certain implementations, calibrating for the resting force can include "zeroing out" the resting force such that the identified resting force constitutes the base value or starting magnitude from which applied forces can be relatively measured.

In some examples, the processor 1314 can monitor the sensor signals 1332, 1338, 1344 (and, in particular, the associated sensor signal properties 1334, 1340, 1346) over time. The terms "sensor signal properties" or "signal properties" can refer to measured values, characteristics, attributes, or qualities of a signal. As some examples, a signal property can include magnitude, strength, amplitude, frequency, wavelength, duration, polarity, rate of change, or other attributes of a signal. Based on monitoring the sensor signals 1332, 1338, 1344 over time, the processor 1314 can identify various operational scenarios and generate a response.

For example, the memory device 1316 can include computer-executable instructions 1318 that, when executed by the processor 1314, cause the processor 1314 to identify a first capacitance signal from the capacitance sensor (e.g., the third sensor 1342), the first capacitance signal having a first signal property for a first time period. The processor 1314 can also identify a second capacitance signal from the capacitance sensor, the second capacitance signal having a second signal property for a second time period. In response to a change from the first signal property to the second signal property lasting at least the second time period (e.g., between 1 second and 30 seconds, between 2 seconds and 10 seconds, or between 5 seconds and 8 seconds), the processor 1314 can transmit a signal to one or more components of the electronic device 1300.

In some examples, the change from the first signal property to the second signal property can indicate a magnitude of signal attenuation due to a particle contaminant (e.g., dust, oil, dirt, grime, debris, etc.) disposed between the case button 1304 and the device button 1328. In other examples, the change from the first signal property to the second signal property can indicate a magnitude of signal attenuation due to misalignment between the case button 1304 and the device button 1328. In response, the processor 1314 can transmit a signal to the display 1322 to cause the display 1322 to generate a user interface prompt (e.g., for the graphical user interfaces 1324, 1326) requesting a user to remove the particle contaminant or adjust the case 1302 relative to the electronic device 1300.

Alternatively, in some examples, the change from the first signal property to the second signal property can indicate a magnitude of signal attenuation due to normal operation of the case button 1304 being positioned over the device button 1328. For example, the change from the first signal property to the second signal property can indicate a particular shift (e.g., a predetermined loss) in capacitance signal strength that is indicative of the case button 1304 being properly positioned over the device button 1328.

In response, the processor 1314 can transmit a signal to the display 1322 to cause the display 1322 to generate a user interface prompt (e.g., for the graphical user interfaces 1324, 1326) confirming that the case 1302 is connected to the electronic device 1300. Along with confirmation of the case connection, the user interface prompt can include a variety of custom prompts, colors, indicators, and/or notifications (e.g., of updated settings).

The processor 1314 can perform a variety of other responses based on identifying the change from the first signal property to the second signal property. For example, the processor 1314 can transmit a signal to the third sensor 1342 (e.g., the capacitance sensor) to change one or more sensing parameters of the third sensor 1342. Sensing parameters can include sample rate, attributes of an applied electric field, sensitivity settings, threshold parameters, etc.

In a further example, the memory device 1316 can include computer-executable instructions 1318 that, when executed by the processor 1314, cause the processor 1314 to identify a capacitance signal from the capacitance sensor (e.g., the third sensor 1342). The capacitance signal can include the sensor signal property for a third time period following the second time period. In response, the processor 1314 can transmit an additional signal to one or more components of the electronic device 1300 (e.g., based on a return from the second signal property to the first signal property lasting at least the third time period). In these or other examples, the return from the second signal property to the first signal property can indicate that the case 1302 has been removed from the electronic device 1300. Accordingly, the processor 1314 can transmit the additional signal to the display 1322 to cause the display 1322 to generate a user interface prompt confirming that the case 1302 is disconnected from the electronic device 1300. Along with confirmation of the case disconnection, the user interface prompt can include a variety of custom prompts, colors, indicators, and/or notifications (e.g., of updated settings).

Any of the features, components, parts, including the arrangements and configurations thereof shown in FIG. 13 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 13.

As mentioned above, a capacitance sensor of an electronic device disclosed herein can sense changes in capacitance through a case button. To do so, a case button of the present disclosure can telescope or extend a capacitance field of view through the case button—not necessarily by modifying the capacitance sensor or amplifying a sensitivity of the capacitance sensor in some way, but by implementing structures and/or high dielectric material(s) that permit the transfer of electric charge through the button body of the case button. In accordance with one or more such examples, FIGS. 14A-14B illustrate schematic views of a capacitance sensor of a device button configured to measure changes in capacitance up to certain distances away from the capacitance sensor.

Figure 14A:
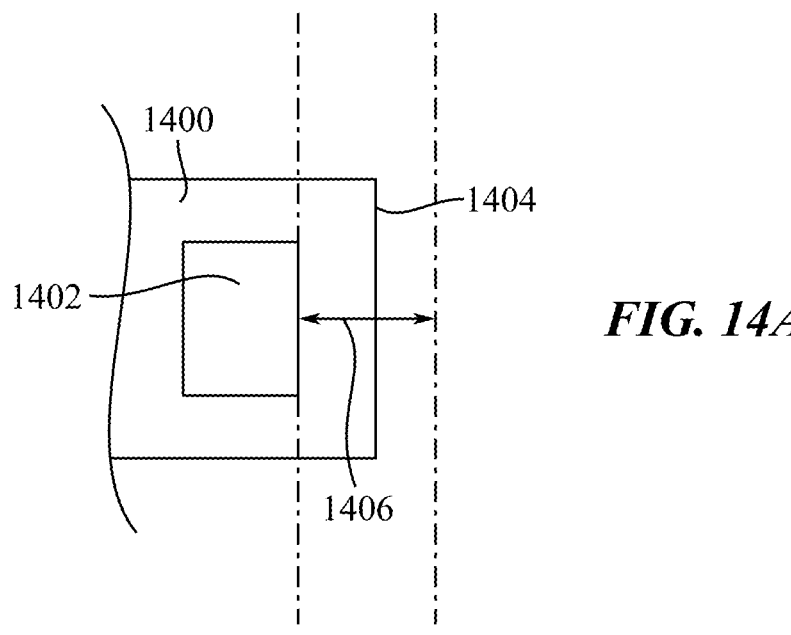
FIGS. 14A-14B illustrate schematic views of a capacitance sensor of a device button in accordance with one or more examples of the present disclosure.

As shown in FIG. 14A, a device button 1400 can include a capacitance sensor 1402. The device button 1400 can be the same as or similar to the device button 108, the device button 504, the touch sensor 812, and/or the device button 1328 discussed above. In these or other examples, the capacitance sensor 1402 can measure changes in capacitance up to a first distance 1406 away from the capacitance sensor 1402 and through the device button 1400. In these or other examples, the first distance 1406 can extend beyond an outer surface 1404 of the button 1400 (e.g., so as to sense touch inputs at the outer surface 1404 when a case is not disposed around the electronic device).

Figure 14B:
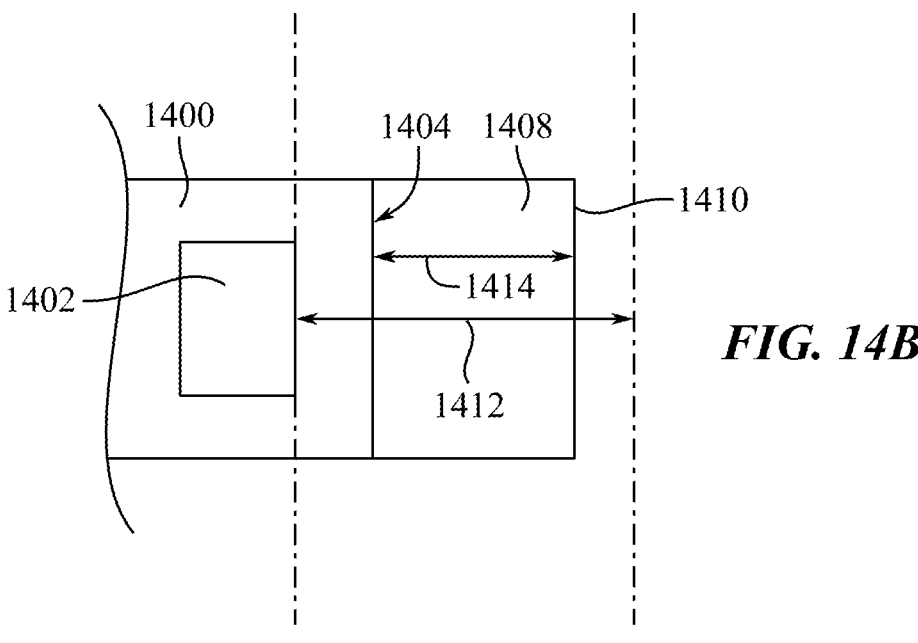

In FIG. 14B, a case button 1408 is disposed against the device button 1400. The case button 1408 can include any of the case buttons and button bodies disclosed herein (e.g., the button 104, the button body 207, the button 350, the button 370, the button body 502, the button body 601, the button 800 with button insert 802, the button 1000, the button 1100, the button 1200, or the case button 1304). When the case button 1408 is disposed against the device button 1400, the case button 1408 can enable the capacitance sensor 1402 to measure changes in capacitance up to a second distance 1412 away from the capacitance sensor 1402 and through both of the device button 1400 and the case button 1408.

The second distance 1412 has several attributes. For example, the second distance 1412 is greater than the first distance 1406. Additionally shown, the second distance 1412 can be greater than a button thickness 1414 of the case button 1408—in which example the second distance 1412 can extend beyond an outer surface 1410 of the case button 1408 to capacitively sense both of the third input type 1312 and the fourth input type 1313 discussed above. In particular examples, the second distance 1412 correlates with the outer surface 1410 of the case button 1408 (e.g., to capacitively sense the third input type 1312). In particular examples, the second distance 1412 can include a distance between 1 millimeter and 2 millimeters greater than the first distance 1406. In other examples, the second distance 1412 can include a distance between 2 millimeters and 10 millimeters greater than the first distance 1406. Accordingly, a variety of different sizes (or thicknesses) of the case button 1408 can be implemented and still permit the capacitance sensor 1402 to perform capacitive touch sensing at the outer surface 1410 of the case button 1408 as disclosed herein.

Any of the features, components, parts, including the arrangements and configurations thereof shown in FIGS. 14A-14B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 14A-14B.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A system, comprising:
an electronic device comprising:
a device button; and
a capacitance sensor coupled to the device button, the capacitance sensor configured to measure changes in capacitance up to a first distance away from the capacitance sensor and through the device button; and
a case comprising a case button that, when disposed against the device button, enables the capacitance sensor to measure changes in capacitance up to a second distance away from the capacitance sensor and through both of the device button and the case button, the second distance being greater than the first distance, wherein the case button comprises:
a first set of conductive pads disposed adjacent to an outer surface of the case button;
a second set of conductive pads disposed adjacent to an inner surface opposite the outer surface, the inner surface configured to contact the device button; and
conductors extending through the case button and connecting the first set of conductive pads and the second set of conductive pads,
wherein the capacitance sensor is configured to sense a change in capacitance caused by a user touch at the outer surface of the case button via one or more of the first set of conductive pads, the conductors, and the second set of conductive pads.

2. The system of claim 1, wherein:
the case button comprises a button thickness; and
the second distance is greater than the button thickness.

3. The system of claim 1, wherein the second distance is between 1 millimeter and 2 millimeters greater than the first distance.

4. The system of claim 1, wherein the second distance correlates with an outer surface of the case button.

5. The system of claim 1, wherein the electronic device further comprises:
a processor; and
a memory device storing instructions that, when executed by the processor, cause the processor to:
identify a first capacitance signal from the capacitance sensor, the first capacitance signal having a first signal property for a first time period;
identify a second capacitance signal from the capacitance sensor, the second capacitance signal having a second signal property for a second time period; and
transmit a signal to one or more components of the electronic device based on a change from the first signal property to the second signal property lasting at least the second time period.

6. The system of claim 1, wherein:
the electronic device comprises a force sensor at the device button; and
the electronic device is configured to calibrate the force sensor when the case is disposed around the electronic device.

7. A system, comprising:
a touch input interface comprising a button body, the button body including a set of conductors spaced apart from each other and extending at least partially through the button body; and
a computing device positionable against the touch input interface, the computing device comprising:
a device button configured to be covered by the button body;
a capacitance sensor coupled to the device button and configured to measure changes in capacitance up to a first distance away from the capacitance sensor and through the device button;
a processor; and
a memory device storing instructions that, when executed by the processor, cause the processor to:
identify a first capacitance signal from the capacitance sensor, the first capacitance signal having a first signal property for a first time period;
identify a second capacitance signal from the capacitance sensor, the second capacitance signal having a second signal property for a second time period; and
transmit a signal to one or more components of the computing device based on a change from the first signal property to the second signal property lasting at least the second time period;
wherein, when the button body is disposed against the device button, the button body enables the capacitance sensor to measure changes in capacitance up to a second distance away from the capacitance sensor through both of the button body and the device button, the second distance being greater than the first distance.

8. The system of claim 7, wherein the change from the first signal property to the second signal property indicates a magnitude of signal attenuation due to at least one of a particle contaminant disposed between the button body and the device button or misalignment between the device button and the button body.

9. The system of claim 8, wherein:
the computing device comprises a display; and the processor is configured to transmit the signal to the display to cause the display to generate a user interface prompt requesting a user to remove the particle contaminant or adjust the touch input interface relative to the computing device.

10. The system of claim 7, wherein the change from the first signal property to the second signal property indicates a magnitude of signal attenuation due to normal operation of the button body being positioned over the device button.

11. The system of claim 10, wherein:

the computing device comprises a display; and the processor is configured to transmit the signal to the display to cause the display to generate a user interface prompt confirming that the touch input interface is connected to the computing device.

12. The system of claim 7, wherein the processor is configured to transmit the signal to the capacitance sensor to change one or more sensing parameters.

13. The system of claim 7, wherein:

the computing device comprises a force sensor coupled to the device button; and the processor is configured to transmit the signal to the force sensor to cause the force sensor to calibrate for a resting force applied by the button body to the device button.

14. The system of claim 7, further comprising instructions that, when executed by the processor, cause the processor to:

identify the first capacitance signal from the capacitance sensor, the first capacitance signal having the first signal property for a third time period following the second time period; and transmit an additional signal to the one or more components of the computing device based on a return from the second signal property to the first signal property lasting at least the third time period.

15. The system of claim 14, wherein:

the computing device comprises a display; and the processor is configured to transmit the additional signal to the display to cause the display to generate a user interface prompt confirming that the touch input interface is disconnected from the computing device.

16. The system of claim 7, wherein the second time period ranges between 2 seconds and 10 seconds.

17. A system, comprising:

an electronic device comprising:

a device button; and a capacitance sensor coupled to the device button, the capacitance sensor configured to measure changes in capacitance up to a first distance away from the capacitance sensor and through the device button; and a case comprising a case button that, when disposed against the device button, enables the capacitance sensor to measure changes in capacitance up to a second distance away from the capacitance sensor and through both of the device button and the case button, the second distance being greater than the first distance, wherein the case button comprises:

a set of conductors spaced apart from each other and extending at least partially through the case button between an outer surface of the case button and an inner surface of the case button;

wherein the capacitance sensor is configured to sense a change in capacitance caused by a user touch at the outer surface of the case button via one or more of the set of conductors.

18. The system of claim 17, wherein the case button comprises a button thickness, and the second distance is greater than the button thickness.

19. The system of claim 17, wherein the electronic device further comprises:

a processor; and a memory device storing instructions that, when executed by the processor, cause the processor to:

identify a first capacitance signal from the capacitance sensor, the first capacitance signal having a first signal property for a first time period;

identify a second capacitance signal from the capacitance sensor, the second capacitance signal having a second signal property for a second time period; and transmit a signal to one or more components of the electronic device based on a change from the first signal property to the second signal property lasting at least the second time period.

20. The system of claim 17, wherein the electronic device comprises a force sensor at the device button, and the electronic device is configured to calibrate the force sensor when the case is disposed around the electronic device.

* * * * *